United States Patent

Sample et al.

(10) Patent No.: US 8,299,652 B2
(45) Date of Patent: Oct. 30, 2012

(54) WIRELESS POWER TRANSFER APPARATUS AND METHOD THEREOF

(75) Inventors: Alanson P. Sample, Seattle, WA (US); Joshua R. Smith, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 12/754,954

(22) Filed: Apr. 6, 2010

(65) Prior Publication Data

US 2010/0187913 A1 Jul. 29, 2010

Related U.S. Application Data

(63) Continuation-in-part of application No. 12/544,974, filed on Aug. 20, 2009, and a continuation-in-part of application No. 12/544,956, filed on Aug. 20, 2009.

(60) Provisional application No. 61/189,502, filed on Aug. 20, 2008.

(51) Int. Cl.
H01F 27/42 (2006.01)
H01F 37/00 (2006.01)
H01F 38/00 (2006.01)

(52) U.S. Cl. .................. 307/104; 320/108; 333/219

(58) Field of Classification Search .................. None
See application file for complete search history.

(56) References Cited

U.S. PATENT DOCUMENTS

| 2007/0032274 | A1 | 2/2007 | Lee et al. |
| 2007/0145830 | A1* | 6/2007 | Lee et al. ................. 307/135 |
| 2007/0296393 | A1* | 12/2007 | Malpas et al. ............ 323/355 |
| 2008/0278264 | A1 | 11/2008 | Karalis et al. |
| 2009/0152954 | A1 | 6/2009 | Le et al. |
| 2009/0174263 | A1* | 7/2009 | Baarman et al. .......... 307/104 |
| 2011/0140537 | A1* | 6/2011 | Takei ........................ 307/104 |

FOREIGN PATENT DOCUMENTS

KR 2002-0007117 A 1/2002

OTHER PUBLICATIONS

International Search Report with Written Opinion corresponding to international application No. PCT/US2010/048628, dated May 20, 2011, 7 pages.
International Preliminary Report on Patentability mailed Apr. 5, 2012, for PCT/US2010/048628.

* cited by examiner

*Primary Examiner* — Rexford Barnie
*Assistant Examiner* — Justen Fauth
(74) *Attorney, Agent, or Firm* — Pillsbury Winthrop Shaw Pittman LLP

(57) ABSTRACT

In accordance with various aspects of the disclosure, a method and apparatus is disclosed that includes features of transmitting power from a transmitter of a wireless power system at a multiplicity of frequencies between a first transmission frequency and a second transmission frequency at a first power level and transmitting power from the transmitter at a second power level and at one or more frequencies between the first transmission frequency and the second transmission frequency if the one or more receiving devices are determined to be coupled to the transmitter.

22 Claims, 20 Drawing Sheets

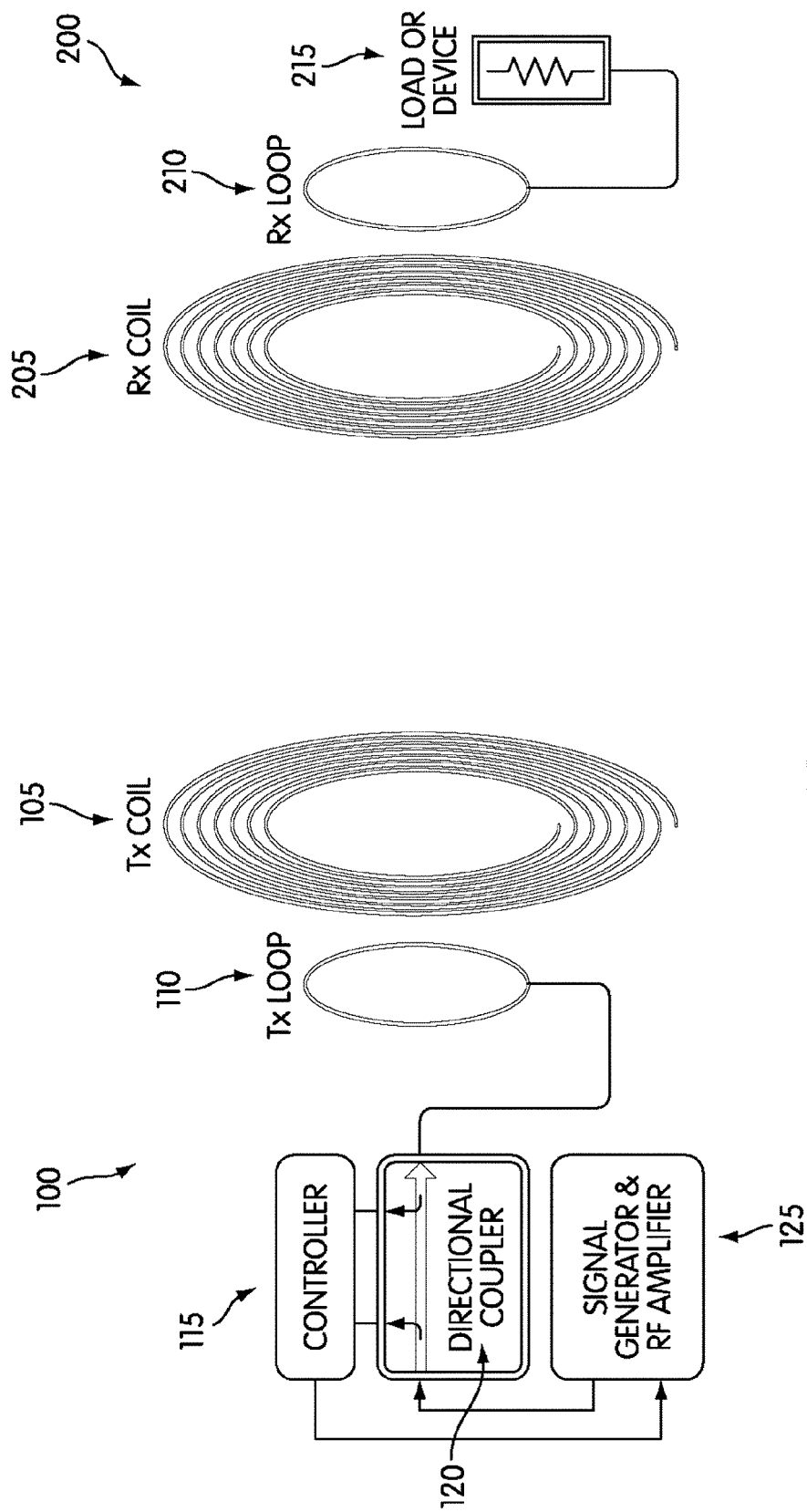

WIRELESS POWER TRANSFER APPARATUS AND METHOD THEREOF

CROSS REFERENCE TO RELATED APPLICATIONS

This application is a continuation-in-part of pending U.S. application Ser. No. 12/544,974 and 12/544,956 both filed on Aug. 20, 2009, which claims benefit under 35 U.S.C. §119(e) from U.S. Provisional Application No. 61/189,502 filed on Aug. 20, 2008. The disclosure of all of the foregoing U.S. patent applications are herein incorporated by reference in their entirety.

BACKGROUND

This disclosure relates generally to the field of power transmission, and in particular, to a method and apparatus for transmitting and receiving power wirelessly.

Wireless power transfer has the potential to transform electronics by "cutting the last cord," freeing users from the need to plug in to recharge devices, and changing the design space, for example by enabling devices with no connectors.

Coupled resonator wireless power transfer is capable of delivering power with more efficiency than far field approaches and at longer range than traditional inductive schemes. However, conventional coupled resonator systems have been limited to operation at a particular fixed distance and orientation, with efficiency falling rapidly as the receiver moves away from the optimal operating point. Moreover, conventional coupled resonator systems use bulky, non-flat resonator structures.

BRIEF DESCRIPTION OF THE DRAWINGS

FIG. 1a shows an exemplary system diagram of an auto-tuning wireless power transfer system in accordance with various aspects of the present disclosure.

DETAILED DESCRIPTION

Figure 1B:
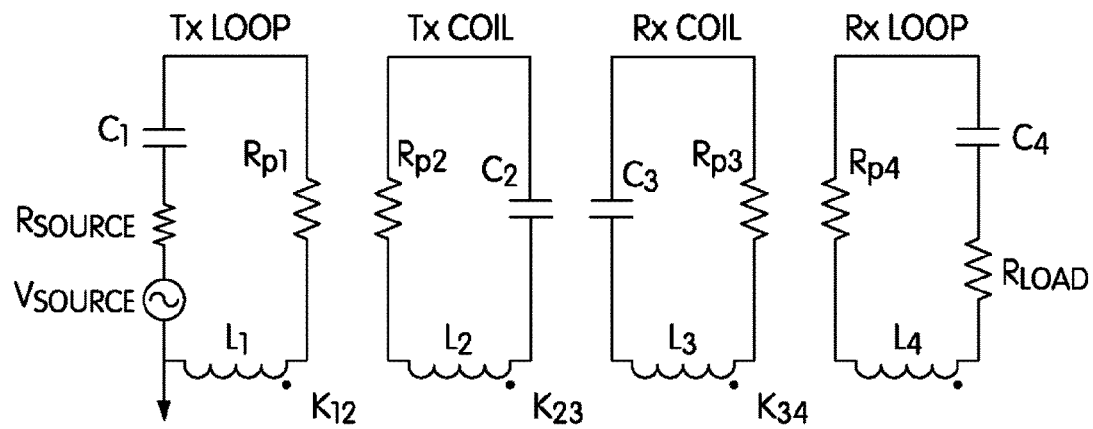
FIG. 1b shows an equivalent circuit diagram for the exemplary system of FIG. 1a in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a method is disclosed that includes transmitting power from a transmitter of a wireless power system at a multiplicity of frequencies between a first transmission frequency and a second transmission frequency at a first power level; and transmitting power from the transmitter at a second power level and at one or more frequencies between the first transmission frequency and the second transmission frequency if the one or more receiving devices are determined to be coupled to the transmitter.

The method can also include measuring a signal at each transmission frequency at an antenna of the transmitter and determining whether one or more receiving devices are coupled to the transmitter based on the measured signal. The measured signal can be selected from the group consisting of: a reflected voltage wave amplitude, a ratio of the reflected voltage wave amplitude to a forward voltage wave amplitude, a reflected power, and a ratio of the reflected power to a forward power. Moreover, the one or more receiving devices can be determined to be coupled to the transmitter if a minimum of the measured signal versus frequency is below a threshold value. Further, the one or more receiving devices can be determined to be coupled to the transmitter if a number of local minima of the measured signal versus frequency is greater than or equal to 2. Still further, the second power level can be higher than the first power level.

In accordance with various embodiments of this disclosure, an apparatus is disclosed that includes a transmitter, including an antenna, wherein the transmitter is configured to transmit power at a multiplicity of frequencies between a first transmission frequency and a second transmission frequency at a first power level; and a controller configured to measure a signal at each transmission frequency at an antenna of the transmitter and determine whether one or more receiving devices are coupled to the transmitter based on the measured signal, the transmitter is configured to transmit power at a second power level and at one or more frequencies between the first transmission frequency and the second transmission frequency if the one or more receiving devices are determined to be coupled to the transmitter.

In the apparatus, the measured signal can be selected from the group consisting of: a reflected voltage wave amplitude, a ratio of the reflected voltage wave amplitude to a forward voltage wave amplitude, a reflected power, and a ratio of the reflected power to a forward power. Moreover, the one or more receiving devices are determined to be coupled to the transmitter if a minimum value of the measured signal versus frequency is below a threshold value. Further, the one or more receiving devices are determined to be coupled to the transmitter if a number of local minima of the measured signal versus frequency is greater than or equal to 2. Still further, the second power level can be higher than the first power level.

In accordance with various embodiments of this disclosure, a method is disclosed that includes transmitting a superposition of a power signal at a first power level at a first frequency with a power signal at a second power level at a second frequency from an antenna of a transmitter, wherein the power signal at the second power level is incremented in transmission frequency from a first value to a second value; measuring a time signal indicative of a transmitter-to-receiver coupling criteria at each frequency point; and transmitting, from the antenna of the transmitter to a receiver, at the first power level and at one or more frequencies between the first frequency and the second frequency if the receiver is determined to be coupled based on the transmitter-to-receiver coupling criteria.

In the method, the measured time signal can be separated the into a first component and a second component; and the second component can be determined as to whether the transmitter-to-receiver coupling criteria is met. Moreover, the measured time signal can be measured at the antenna of the transmitter or at an antenna of the receiver. Further, the measured time signal indicative of the transmitter-to-receiver coupling criteria can be selected from the group consisting of: a reflected voltage wave amplitude, a ratio of the reflected voltage wave amplitude to a forward voltage wave amplitude, a reflected power, and a ratio of the reflected power to a forward power. Still further, the method can include separating the measured time signal into the first component and the second component and performing a frequency transform of the measured time signal and isolating a component of the measured time signal corresponding to a frequency band around the second frequency.

In the method, the measured time signal can be separated into the first component and the second component by using a demodulation circuit where the measured time signal is separately multiplied by an amplitude-scaled version of the power signal at the first power level at the first frequency and the power signal at the second power level at the second frequency and each resulting signal is subsequently low-pass filtered to result in the first component and the second component. Moreover, the transmitter-to-receiver coupling criteria can be measured at the transmitter and is a minimum value of the ratio of the reflected voltage wave amplitude to the forward voltage wave amplitude, or a minimum value of the ratio of the reflected power to the forward power, or a minimum value of the reflected voltage wave amplitude, or a minimum value of the reflected voltage wave amplitude. Further, the transmitter-to-receiver coupling criteria can be measured at the receiver and can be a maximum value of received power, or a maximum value or received voltage.

In accordance with various embodiments of this disclosure, an apparatus is disclosed that includes a transmitter, including an antenna, wherein the transmitter is configured to transmit a superposition of a power signal at a first power level at a first frequency with a power signal at a second power level at a second frequency, wherein the power signal at the second power level is incremented in transmission frequency from a first value to a second value; a controller configured to measure a time signal indicative of a receiver coupling criteria at the antenna of the transmitter at each frequency point, separate the measured time signal into a first component and a second component, and determine whether the second component meets the receiver coupling criterion; and, wherein the transmitter is configured to transmit, from the antenna of the transmitter, at the first power level and at one or more frequencies between the first frequency and the second frequency if the transmitter-to-receiver coupling criteria is met.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Turning now to the various aspects of the disclosure, a model is disclosed of coupled resonators in terms of passive circuit elements. The conventional analysis, based on coupled mode theory, is difficult to apply to practical systems in terms of quantities such as inductance (L), capacitance (C), and resistance (R) that are measurable in the laboratory at high frequencies (HF band) that is herein disclosed. The disclosed model shows that to maintain efficient power transfer, system parameters must be tuned to compensate for variations in Transmit-to-Receive ("Tx-Rx") range and orientation.

Figure 1C:
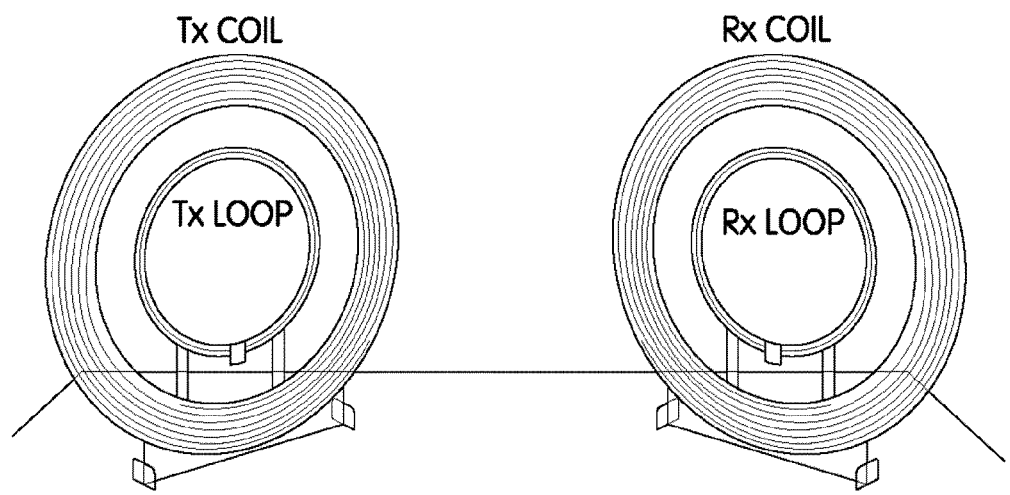
FIG. 1c shows a photograph of an experimental set-up of a Tx Loop and Tx Coil (left), and Rx Coil and Rx Loop (right) in accordance with various aspects of the present disclosure.

FIG. 1a shows an exemplary system diagram of an auto-tuning wireless power transfer system in accordance with various aspects of the present disclosure. FIG. 1b shows an equivalent circuit diagram including four coupled resonant circuits for the exemplary system of FIG. 1a. FIG. 1c shows a photograph of an experimental set-up of a wireless power transfer apparatus including a Tx Loop and Tx Coil (left), and Rx Coil and Rx Loop (right).

Turning to FIG. 1a, one aspect of the present disclosure is shown. A transmitter 105 is configured to supply power wirelessly to a receiver 200. The transmitter 100 is shown having a transmitter resonator or resonator of the transmitter 105 as a coil (Tx Coil). Similarly, the receiver 200 is shown having a receiver resonator or resonator of the receiver 205 as a coil (Rx Coil). In some aspects, the transmitter resonator (Tx Coil) and/or the receiver resonator (Rx Coil) is a substantially two-dimensional structure. The transmitter resonator (Tx Coil) is coupled to a transmitter impedance-matching structure 110. Similarly, the receiver resonator (Rx Coil) is coupled to a receiver impedance-matching structure 210. As shown in FIG. 1a, the transmitter impedance-matching structure 110 is a loop (Tx Loop) and the receiver impedance-matching structure 210 is a loop (Rx Loop). Other impedance-matching structures may be used for the transmitter 100, the receiver 200, or both which include a transformer and/or and an impedance-matching network. The impedance-matching network may include inductors and capacitors configured to connect a signal source to the resonator structure.

Transmitter 100 includes a controller 115, a directional coupler 120 and a signal generator and radio frequency (RF) amplifier 125 which are configured to supply control power to a drive loop (Tx Loop). Impedance-matching structure 110 of the transmitter 100 such as drive loop or Tx Loop is configured to be excited by a source (not shown in FIG. 1a) with finite output impedance $R_{source}$. Signal generator 125 output is amplified and fed to the Tx Loop. Power is transferred magnetically from Tx Loop to Tx Coil to Rx Loop to Rx Coil, and delivered by ohmic connection to the load 215.

If the system becomes mis-tuned because of a change in Tx-Rx distance, a reflection may occur on the transmitter side. The directional coupler 120 separates the reflected power from the forward power, allowing these quantities to be measured separately. The controller 115 adjusts transmit frequency to minimize the ratio of reflected to forward power, thereby retuning the system for the new working distance.

Turning to FIG. 1b, a simple one-turn drive loop (Tx Loop) can be modeled as an inductor $L_1$ with parasitic resistance $R_{p1}$. For element i, distributed inductance is labeled $L_i$, distributed capacitance is $C_i$, and parasitic resistance is $R_{pi}$. The coupling coefficient for the mutual inductance linking inductor i to inductor j is labeled $k_{ij}$. Capacitor may be added to make drive loop (Tx Loop) resonant at a frequency of interest, bringing the net capacitance for the loop to $C_1$. Drive loop (Tx Loop) is powered by source ($V_{Source}$). Transmit coil (Tx Coil) may be a multi-turn air core spiral inductor $L_2$, with parasitic resistance $R_{p2}$. Capacitance $C_2$ of transmit coil (Tx Coil) is defined by its geometry. Inductors $L_1$ and $L_2$ are connected with coupling coefficient $k_{12}$, where $$k_{ij} = \frac{M_{ij}}{\sqrt{L_i L_j}}$$

is the coupling coefficient linking inductors i and j, and $M_{ij}$ is the mutual inductance between i and j. Note that $0 \leq k_{ij} \leq 1$. Coupling coefficient $k_{12}$ is determined by the geometry of drive loop (Tx Loop) and transmit coil (Tx Coil). Receiver apparatus is defined similarly to the transmitter apparatus: $L_3$ is the inductance of receiver coil (Rx Coil) and $L_4$ is the inductance of load loop (Rx Loop). Transmitter coil (Tx Coil) and receiver coil (Rx Coil) are linked by coupling coefficient $k_{23}$, or called transmitter-to-receiver coupling, which depends on both Tx-Rx range and relative orientation. Drive loop (Tx Loop) and load loop (Rx Loop) may be configured to impedance match source and load to high Q resonators (Tx Coil and Rx Coil).

As discussed above, source and load loops (Tx Loop and Rx Loop) may be replaced by other impedance matching components. The Tx loop (or equivalent component) and Tx coil may both be embedded in the same piece of equipment (and likewise for the Rx coil and Rx Loop or equivalent component). Thus, coupling constants $k_{12}$ and $k_{34}$ are variables that the can be, in principle, controlled, unlike coupling constant $k_{23}$, which is an uncontrolled environmental variable determined by usage conditions.

Uncontrolled environmental parameters may include parameters such as a range between the transmitter resonator (Tx Coil) and the receiver resonator (Rx Coil), a relative orientation between the transmitter resonator (Tx Coil) and the receiver resonator (Rx Coil), and a variable load on the receiver resonator (Rx Coil). By way of a non-limiting example, a variable load can be a device that experiences variations in a power state, such as a laptop computer powering on, down, or entering stand-by or hibernate mode. Other examples, may include a light bulb having various illumination states, such a dim or full brightness.

System parameters, such as the coupling constants $k_{12}$ and $k_{34}$, are variables that the can be, in principle, controlled and that we can be adjust to compensate for the changes in environmental parameters. Other such system parameters may include a frequency at which power is transmitted, an impedance of the transmitter resonator and an impedance of the receiver resonator.

Writing Kirchhoffs voltage law (KVL) for each of the sub-circuits in the FIG. 1b allows the current in each to be determine:

$$I_1\left(R_{Source} + R_{p1} + j\omega L_1 + \frac{1}{j\omega C_1}\right) + j\omega I_2 k_{12}\sqrt{L_1 L_2} = V_S$$

$$I_2\left(R_{p2} + j\omega L_2 + \frac{1}{j\omega C_2}\right) + j\omega\left(I_1 k_{12}\sqrt{L_1 L_2} - I_3 k_{23}\sqrt{L_2 L_3}\right) = 0$$

$$I_3\left(R_{p3} + j\omega L_3 + \frac{1}{j\omega C_3}\right) + j\omega\left(I_4 k_{34}\sqrt{L_3 L_4} - I_2 k_{23}\sqrt{L_2 L_3}\right) = 0$$

$$I_4\left(R_{Load} + R_{p4} + j\omega L_4 + \frac{1}{j\omega C_4}\right) + j\omega I_3 k_{34}\sqrt{L_3 L_4} = 0$$

Solving these four KVL equations simultaneously for the voltage across the load resistor yields the transfer function for this system of coupled resonators:

$$V_{Gain} \equiv \frac{V_{Load}}{V_{Source}} = \frac{i\omega^3 k_{12} k_{23} k_{34} L_2 L_3 \sqrt{L_1 L_4}\, R_{Load}}{k_{12}^2 k_{34}^2 L_1 L_2 L_3 L_4 \omega^4 + Z_1 Z_2 Z_3 Z_4 + \omega^2(k_{12}^2 L_1 L_2 Z_3 Z_4 + k_{23}^2 L_2 L_3 Z_1 Z_4 + k_{34}^2 L_3 L_4 Z_1 Z_2)} \quad (1)$$

where $V_{Load}$ is the voltage across the load resistor and $$Z_1 = (R_{p1} + R_{Source} + i\omega L_1 - i/(\omega C_1))$$

$$Z_2 = (R_{p2} + i\omega L_2 - i/(\omega C_2))$$

$$Z_3 = (R_{p3} + i\omega L_3 - i/(\omega C_3))$$

$$Z_4 = (R_{p4} + R_{Load} + i\omega L_4 - i/(\omega C_4))$$

The analytical transfer function was cross-validated by comparing its predictions with SPICE (Simulation Program with Integrated Circuit Emphasis) simulations. As is known, SPICE is a general-purpose analog electronic circuit simulator that is used in integrated circuit (IC) and board-level design to check the integrity of circuit designs and to predict circuit behavior. From Eq. 1, a scattering parameter $S_{21}$ can be calculated and shown to be:

$$S_{21} = 2 \frac{V_{Load}}{V_{Source}} \left( \frac{R_{Source}}{R_{Load}} \right)^{1/2} \quad (2)$$

which can be important experimentally since it can be measured with a vector network analyzer, which as known, is an instrument used to analyze the properties of electrical networks, especially those properties associated with the reflection and transmission of electrical signals known as scattering parameters (S-parameters). The entire wireless power transfer apparatus can be viewed as a two-port network (one port being the input, fed by source, and the other the output, feeding the load). In a two-port network, $S_{21}$ is a complex quantity representing the magnitude and phase of the ratio of the signal at the output port to the signal at the input port. Power gain, the essential measure of power transfer efficiency, is given by $|S_{21}|^2$, the squared magnitude of $S_{21}$. As presented below, experimental and theoretical results are presented in terms of $|S_{21}|$.

Figure 2A:
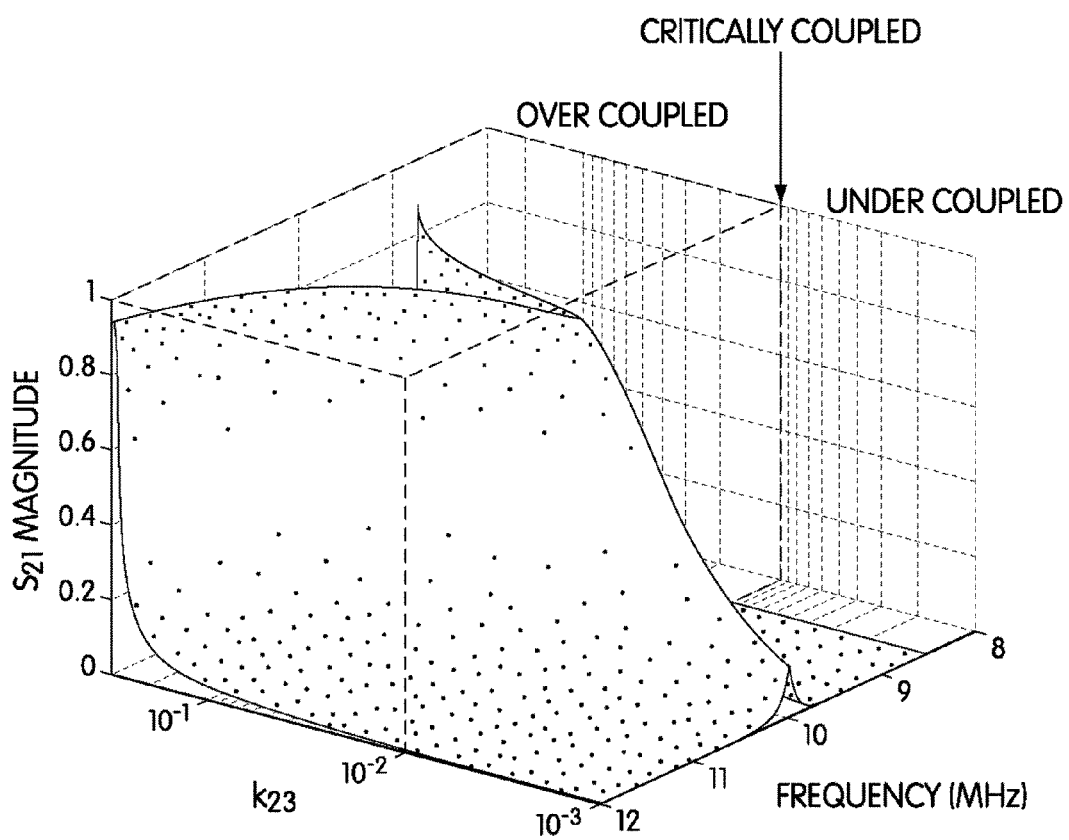
FIG. 2a shows a plot of $|S_{21}|$ as a function of frequency and Tx-Rx coupling ($k_{23}$) in accordance with various aspects of the present disclosure.

In FIG. 2a, $|S_{21}|$ is plotted for a realistic set of parameters, as shown in Table S1 below, as a function of the Tx-Rx coupling constant $k_{23}$ and the driving angular frequency $\omega$. In this plot, $k_{12}$ and $k_{34}$ are held constant, which would typically be the case for a fixed antenna design. This elementary transfer function neglects parasitic coupling, such as that from the drive loop (Tx Loop) direct to the receiver coil (Rx Coil), i.e. the $k_{13}$ coupling. A more complete model that includes parasitic effects will be discussed later. However, the elementary model captures the essential behavior and is likely to be useful long term, as future systems may have reduced parasitic coupling.

FIG. 2a shows the dependence of system efficiency on frequency and $k_{23}$. On the $k_{23}$ axis, smaller values correspond to larger Tx-Rx distances because the mutual inductance between the transmitter coil (Tx Coil) and receiver coil (Rx Coil) decreases with distance. Changing the angle of the receiver coil (Rx Coil) with respect to the transmitter coil (Tx Coil) can also change $k_{23}$. For example, rotating an on-axis receiver coil (Rx Coil) from being parallel to the transmitter coil (Tx Coil) to being perpendicular would decrease their mutual inductance and therefore $k_{23}$. Moving the receiver coil (Rx Coil) in a direction perpendicular to the transmit axis would also typically change $k_{23}$.

FIG. 2a shows the plot partitioned into 3 regimes, corresponding to different values of $k_{23}$. In the overcoupled regime, represented in FIG. 2a as the dotted lines that enclose the V-shaped ridge, $k_{23} > k_{Critical}$. (The value of the constant $k_{Critical}$ will be defined below in terms of the features of the surface plotted in the figure.) In the critically coupled regime, which is the plane bounding this volume, $k_{23} = k_{Critical}$. In the under-coupled regime beyond the volume outlined by the dotted lines, $k_{23} < k_{Critical}$.

High efficiency of power transmission occurs on the top of the V-shaped ridge. The V-shape is due to resonance splitting: in the over-coupled regime (i.e. for any choice of $k_{23} > k_{Critical}$) there are two frequencies at which maximum power transfer efficiency occurs. These correspond to the system's two normal modes. The more strongly coupled the resonators (transmitter coil (Tx Coil) and receiver coil (Rx Coil)) are, the greater the frequency splitting; the difference between the two normal mode frequencies increases with $k_{23}$. As $k_{23}$ decreases, the modes move closer together in frequency until they merge. The value of $k_{23}$ at which they merge (the point denoted by "I" on the V-shaped ridge) is defined to be the critical coupling point $k_{Critical}$. The frequency at which the modes merge is the single resonator natural frequency $\omega = \omega_0$ (assuming both coils have the same $\omega_0$). Note that the mode amplitude is nearly constant throughout the over-coupled and critically coupled regime, allowing high efficiency; as $k_{23}$ drops below $k_{Critical}$, the single mode amplitude decreases, lowering the maximum system efficiency achievable.

Because of the nearly constant mode amplitude throughout the overcoupled regime, system efficiency could be kept nearly constant as $k_{23}$ varies (as long as $k_{23} > k_{Critical}$), if the system transmit frequency could be adjusted to keep the operating point on top of the ridge. In other words, as the Tx-Rx distance (and thus $k_{23}$) changes due to motion of the receiver, the system could be re-tuned for maximum efficiency by adjusting the frequency to keep the operating point on the top of the ridge.

As disclosed below, tuning transmitter resonator (Tx Coil) automatically to maximize transmission power can be achieved based on thee results. Because the tuning compensates for changes in $k_{23}$, the same technique can compensate for any geometrical variation that changes $k_{23}$ (by a sufficiently small amount), including changes in orientation, and non-range changing translations.

A correctly functioning control system may allow the system efficiency to be nearly independent of range, for any range up to the critical range. It may be counter-intuitive that power transfer efficiency can be approximately independent of range (even within a bounded working region), since the power delivered by far-field propagation depends on range r as $1/r^2$, and traditional non-adaptive inductive schemes have $1/r^3$ falloff. Therefore, the top of the efficiency ridge, along which the efficiency is approximately constant is referred to as the "magic regime" for wireless power transfer. The values of $k_{23}$ that the magic regime spans are given by $k_{Critical} \leq k_{23} \leq 1$. Thus, the smaller $k_{Critical}$, the larger the spatial extent spanned by the magic regime, and thus the larger the system's effective working range.

Figure 2B:
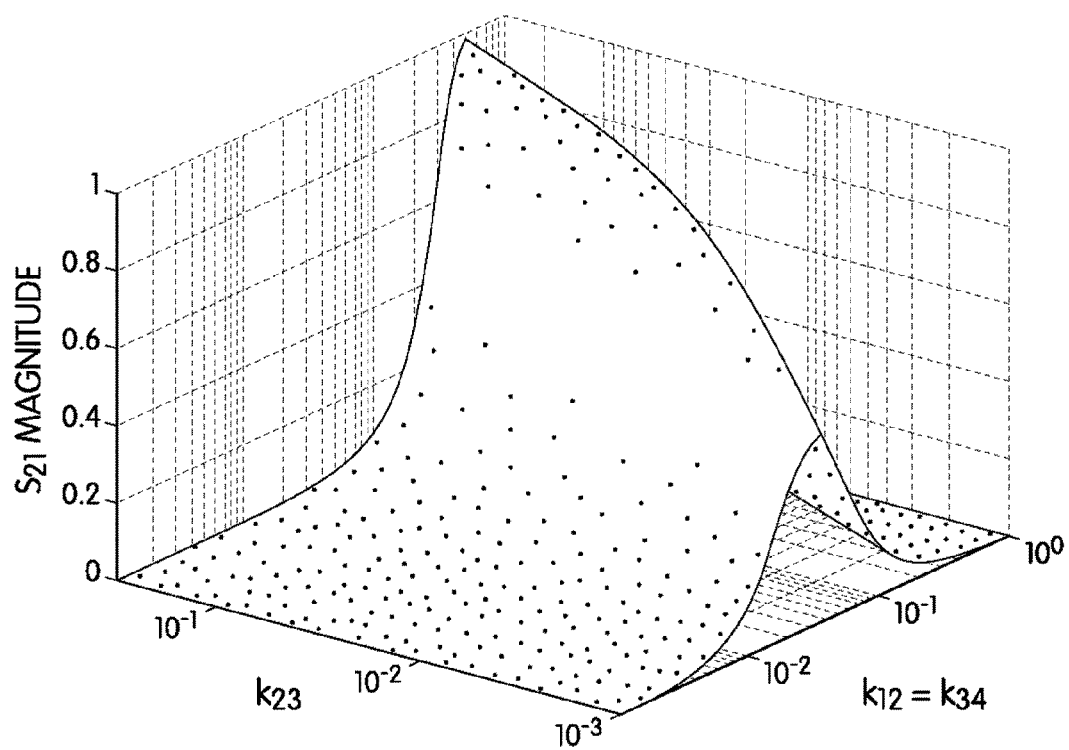
FIG. 2b shows a plot of $|S_{21}|$ as a function of $k_{23}$ and $k_{12}$ in accordance with various aspects of the present disclosure.

In FIG. 2b, frequency is held constant while $k_{12}$ (and $k_{34}$, constrained for simplicity to equal $k_{12}$) is varied. Adapting $k_{12}$ to compensate for detuning caused by changes in $k_{23}$ is another method for adapting to varying range and orientation.

Further analysis of the transfer function (Eq. 1) gives insight into the effect of circuit parameters on the performance of the wireless power system. As explained above, the effective operating range is determined by the value of $k_{Critical}$: the smaller $k_{Critical}$, the greater the spatial extent of the magic regime.

So, to understand system range, it will be useful to solve for $k_{Critical}$ in terms of design parameters. First, the transfer function can be clarified by substituting expressions for quality factor:

$$Q_i = \frac{1}{R_1} \sqrt{\frac{L_i}{C_i}} = \frac{\omega_0^i L_i}{R_i} = \frac{1}{\omega_0^i R_i C_i}, \text{ where } \omega_0^i = \frac{1}{\sqrt{L_i C_i}}$$

is the uncoupled resonant frequency of element i.

For simplicity, consider a symmetrical system, with the quality factor of the Tx and Rx coils equal, $Q_{Coil} = Q_2 = Q_3$, and the quality factors of the Tx and Rx loops equal, $Q_{Loop} = Q_1 = Q_4$. The symmetric loop-to-coil coupling $k_{12} = k_{34}$ will be denoted $k_{lc}$. Also it is assumed that $R_{Source}=R_{Load}$, $R_{p1}<R_{Source}$, $R_{p4}<R_{Load}$, and that the uncoupled resonant frequencies are equal: $\omega_0{}^i=\omega_0$ for all i. To find an expression for the critical coupling value, consider the transfer function when the system is driven at frequency $\omega=\omega_0$. This corresponds to a 2D slice of FIG. 2a along the center frequency of 10 MHz, whose apex is the critical coupling point of the system. Using the expressions for $\omega$ in terms of Q above, this slice of the transfer function can be written $$V_{Gain|\omega=\omega_0} = \frac{ik_{23}k_{lc}^2 Q_{Coil}^2 Q_{Loop}^2}{k_{23}^2 Q_{Coil}^2 + (1+k_{lc}^2 Q_{Coil}Q_{Loop})^2} \quad (3)$$

To derive an expression for $k_{Critical}$, the maximum of Eq. 3 is found by differentiating with respect to $k_{23}$. Then $k_{Critical}$ is the point along the $k_{23}$ axis of FIG. 2a that (for positive values of k and Q) sets this derivative to zero:

$$k_{Critical} = \frac{1}{Q_{Coil}} + k_{lc}^2 Q_{Loop} \quad (4)$$

Finally, $k_{Critical}$ is substituted for $k_{23}$ in Eq. 3 to find the voltage gain at the critical coupling point: $V_{GainCritical}=ik_{lc}^2 Q_{Coil}Q_{Loop}/2(1+k_{lc}^2 Q_{Coil}Q_{Loop})$. Using Eq. 2, and assuming that $R_{load}=R_{source}$, this voltage gain can be converted into $|S_{21}|$, which will be convenient to abbreviate $G_{Critical}$:

$$G_{Critical} \equiv |S_{21}|_{Critical} = \frac{k_{lc}^2 Q_{Coil}Q_{Loop}}{1+k_{lc}^2 Q_{Coil}Q_{Loop}} = \frac{k_{lc}^2 Q_{Loop}}{k_{Critical}} \quad (5)$$

Figure 5:
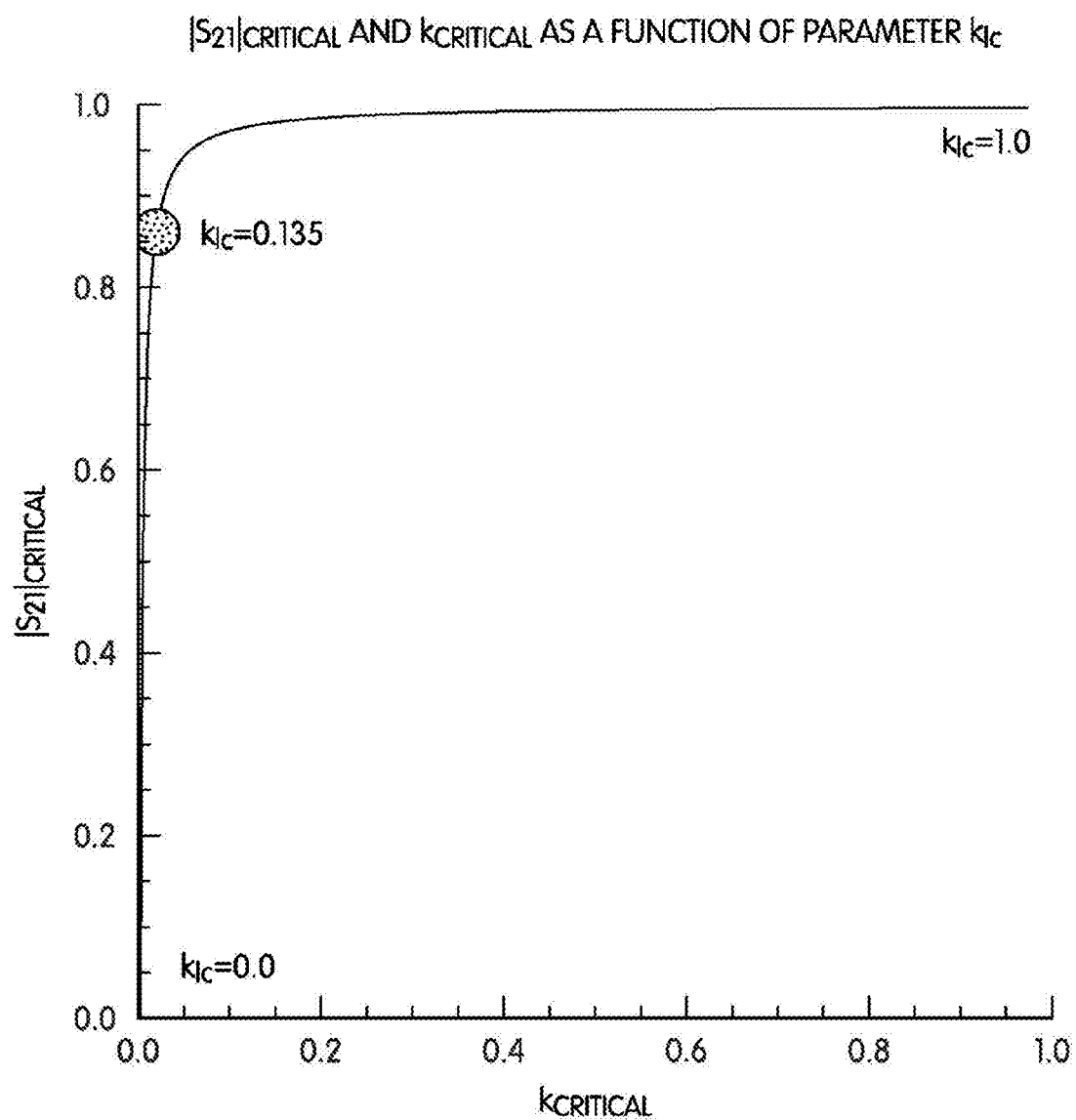
FIG. 5 shows efficiency—range tradeoff: $|S_{21}|_{Critical}$ vs. $k_{Critical}$ tradeoff curve as a function of the tuning parameter $k_{lc}$, with our system's operating point indicated (large dot at $k_{lc}$=0.135) in accordance with various aspects of the present disclosure.

This equation quantifies the system's efficiency at the furthest point on the magic regime ridge. Recall that in order to maximize range, we must minimize $k_{Critical}$ because this increases the extent of the magic regime, which spans from $k_{Critical}$ to 1.0. Examining Eq. 4, reducing $k_{lc}$ lowers $k_{Critical}$ and therefore increases range. However, according to Eq. 5, reducing $k_{lc}$ also reduces efficiency. Indeed, the choice of $k_{lc}$ trades off the efficiency level in the magic regime (height of magic regime ridge) vs. the extent of the magic regime (spatial extent of magic regime, i.e. maximum range). FIG. 5 is a plot of this tradeoff curve, $|S_{21}|_{Critical}$ vs $k_{Critical}$ as a function of the common parameter $k_{lc}$.

The area under this tradeoff curve serves as a useful figure of merit (FOM) for system performance: $FOM=\int_0^1 G_{Critical}dk_{Critical}$. An optimal wireless power system, which could losslessly deliver power at infinite range (0 coupling), would have an FOM of unity. For the symmetrical case (in which corresponding parameters on the transmit and receive sides are equal), the FOM integral can be evaluated analytically. Assuming that $Q_{Coil}>1$, the area under the tradeoff curve turns out to be $$FOM = 1 - \frac{1}{Q_{Coil}} - \frac{\ln Q_{Coil}}{Q_{Coil}}. \quad (6)$$

The FOM turns out to depend only $Q_{Coil}$, and is independent of $Q_{Loop}$. The quality factor of the resonators (coils) entirely determines this measure of system performance, which approaches to unity in the limit of infinite $Q_{Coil}$. The measured $Q_{Coil}$ values for the experimental system, which is discussed further below, are around 300 and 400, corresponding to FOM=0.978 and FOM=0.982 (plugging each $Q_{Coil}$ value into the symmetric FOM formula).

Choosing a feasible value of $Q_{Loop}$ is the next important design question. To derive a guideline, an expression is found for the "knee" of the range-efficiency tradeoff curve, which we will define to be the point at which the slope $$\frac{dG_{Critical}}{dk_{Critical}}$$

equals unity. The value of $k_{Critical}$ at which this occurs turns out to be $$k_{CriticalKnee}=Q_{Coil}^{-1/2} \quad (7)$$

If $Q_{Loop}$ is too small, then even setting $k_{lc}$ to its maximum value of 1.0, $k_{Critical}$ will not be able to reach $k_{CriticalKnee}$. To find the minimum necessary $Q_{Loop}$ value, Eq. 4 can be solved for $Q_{Loop}$ with $K_{Critical}k_{CriticalKnee}$ and $k_{lc}=1$, which yields $Q_{Loop}=(Q_{Coil}^{1/2}=1)Q_{Coil}^{-1} \approx Q_{Coil}^{-1/2}$ for large $Q_{Coil}$. Specifically, a good operating point on the tradeoff curve should be achievable as long as $Q_{Loop}>Q_{Coil}^{-1/2}$. For $Q_{Coil}=300$, this condition becomes $Q_{Loop}>0.06$.

A conclusion is that $Q_{Coil}$ determines system performance (as measured by our FOM), as long as a minimum threshold value of $Q_{Loop}$ is exceeded. The actual value of $Q_{Loop}$ is dominated by the source and load impedances. The larger $Q_{Coil}$ is, the smaller the required minimum $Q_{Loop}$. Conversely, moving to a more demanding load (with $Q_{Loop}$ below the current threshold value) could be accomplished by sufficiently increasing $Q_{Coil}$.

Turning now to FIG. 1c which shows an experimental validation of the model. FIG. 1c shows transmitter coils (Tx Coil) and receiver coils (Rx Coil) that was used to validate the theoretical model, and to implement automatic range and orientation tuning. The transmitter on the left includes a small drive loop (Tx Loop) centered within a flat spiral transmit resonator (Tx Coil); the receiver side loop (Rx Loop) and coil (Rx Coil) are visible on the right. The system was characterized with a vector network analyzer in addition to the circuit values shown in Table S1 and S2, below. The first group of measurements consisted of $S_{11}$ measurements; the $S_{11}$ scattering parameter is the ratio of complex reflected voltage to complex transmitted voltage at the input port. The ratio of reflected to transmitted power is given by $|S_{11}|^2$. L, C, and R values were extracted for each loop by fitting a model with these parameters to the $S_{11}$ data. The second group of measurements were $S_{11}$ measurements of the Tx Loop coupled to the Tx Coil, and corresponding measurements on the receiver side. Values were extracted for coil resonant frequency $f_0$ and Q, as well as loop-coil coupling coefficients $k_{12}$ and $k_{34}$, again by fitting a model to data from both groups of measurements. It is not likely to extract L, C, and R values for the coils from these measurements because more than one parameter set is consistent with the data. So, an inductance value was calculated numerically for the coils based on their geometry, which then allowed C and R values to be calculate given the Q and f values.

The distance-dependent coupling coefficients are $k_{23}$ (the main coil to coil coupling constant), and the parasitic coupling terms $k_{13}$, $k_{24}$, and $k_{14}$. To measure these, vector $S_{21}$ data (not just $|S_{21}|$) was collected at a variety of Tx-Rx ranges for the complete 4 element system. Then at each distance, a non-linear fit was performed to extract the coupling coefficients. As an alternative method for finding the coupling coefficients, Neumann's formula was used to calculate the coupling coefficients directly from geometry.

Table S1 shows circuit values used to evaluate the elementary model.

TABLE S1

| PARAMETER | Value |
|---|---|
| $R_{source}$, $R_{Load}$ | 50 Ω |
| $L_1$, $L_4$ | 1.0 uH |
| $C_1$, $C_4$ | 235 pF |
| $R_{p1}$, $R_{p4}$ | 0.25 Ω |
| $K_{12}$, $K_{34}$ | 0.10 |
| $L_2$, $L_3$ | 20.0 uH |
| $C_2$, $C_3$ | 12.6 pF |
| $R_{p2}$, $R_{p3}$ | 1.0 Ω |
| $K_{23}$ | 0.0001 to 0.30 |
| $f_0$ | 10 MHz |
| Frequency | 8 MHz to 12 MHz |

It is to be noted that the expression for $k_{Critical}$ (Eq. 4) specifies the value of $k_{23}$ that would be required to achieve critical coupling; it is not the case that the required coupling is achievable for all choices of Q, since only values corresponding to $k_{23} \leq 1$ are realizable. Since all quantities in Eq. 4 are positive, it is clearly necessary (though not sufficient) that $1/Q_{Coil} \leq 1$ and that $k_{lc}^2 Q_{Loop} \leq 1$ for a realizable $k_{Critical}$ to exist. If a realizable $k_{Critical}$ does not exist, then there is no tuning that will allow the system to achieve the full efficiency of the magic regime; even when the system is maximally coupled, so that $k_{23}=1$, the system would operate in the sub-optimal under-coupled regime. It is to be noted that in practice it may not be possible to achieve $k_{lc}=1$, which would then require a larger minimum value of $Q_{Loop}$. Also, it is merely a coincidence that the minimum value of $Q_{Loop}$ happens to be numerically so close to the value of $k_{CriticalKnee}$, since these are logically distinct.

To evaluate the integral of the parametric curve $G_{Critical}$ vs $k_{Critical}$ (both of which are parameterized by $k_{lc}$), $k_{lcMax}$ is solved for in Eq. 4, the value of the parameter $k_{lc}$ corresponding to the upper integration limit $k_{Critical}=1.0$, finding $$k_{lcMax} = \sqrt{\frac{Q_{Coil}-1}{Q_{Loop}Q_{Coil}}}.$$

The correct lower integration limit is $k_{lc}=0$. So, $$FOM = \int_0^{k_{lcMax}} G_{Critical} \frac{dk_{Critical}}{dk_{lc}} dk_{lc},$$

$$\text{with } \frac{dk_{Critical}}{dk_{lc}} = 2k_{lc}Q_{Loop}.$$

Note that the power vs. range tradeoff does not indicate that power deliverable falls as the receiver moves further from the transmitter; it indicates that choice of $k_{lc}$ trades off the extent of the "magic regime" (width of the magic regime plateau) with the amount of power delivered within the magic regime (height of the plateau).

The model was experimental validation using a drive loop that was 28 cm in diameter, with a series-connected variable capacitor used to tune the system to about 7.65 MHz. A SubMiniature version A (SMA) connector was also placed in series so that a RF amplifier was able to drive the system as described in FIG. 1a. The large transmitter coil started with an outer diameter of 59 cm and spiraled inwards with a pitch of 1 cm for approximately 6.1 turns. It was difficult to accurately predict the self capacitance of the coils, so the resonant frequency was tuned by manually trimming the end of the spiral until it resonates at ~7.65 MHz. The receiver was constructed similarly although minor geometrical differences which resulted in the Rx coils having roughly 6.125 turns after being tuned to ~7.65 MHz. All the elements were made of 2.54 mm diameter copper wire, supported by Plexiglas armatures.

A first group of measurements of the experimental set-up included $S_{11}$ measurements (where $S_{11}$ is the ratio of reflected voltage to transmitted voltage at the input port) of the Tx loop (denoted Measurement 1T in Table S2) and Rx loop (Measurement 1R), without the coils. From these, L, C, and R values were extracted for the loops by least squares fitting. The second group of measurements were $S_{11}$ measurements of the Tx loop coupled to the Tx coil (Measurement 2T), and a corresponding receiver-side measurement denoted 2R. Using data from the second group of measurements and the previously extracted loop parameters, values were extracted for coil resonant frequency $f_0$ and Q, as well as loop-coil coupling coefficients $k_{12}$ and $k_{34}$. It was not possible to extract L, C, and R values from these measurements. So, an inductance value for the coils based on their geometry was calculated numerically, which then allowed C and R values to be calculated.

Table S2 is shown below.

TABLE S2

MEASURED AND CALCULATED STATIC (NON-DISTANCE DEPENDENT) SYSTEM PARAMETERS

| | TRANSMITTER | | | RECEIVER | | |
|---|---|---|---|---|---|---|
| COMPONENT | VALUE | SOURCE | COMPONENT | VALUE | SOURCE |
| $L_1$ | 0.965 uH | Measurement 1T | $L_4$ | 0.967 uH | Measurement 1R |
| $C_1$ | 449.8 pF | Measurement 1T | $C_4$ | 448.9 pF | Measurement 1R |
| $R_{p1}$ | 0.622 Ω | Measurement 1T | $R_{p4}$ | 0.163 Ω | Measurement 1R |
| $R_{source}$ | 50 Ω | Manufacturer Spec | $R_{load}$ | 50 Ω | Manufacturer Spec |
| $Q_1$ | 0.91 | $L_1$, $C_1$, $R_{p1}$, $R_{source}$ | $Q_4$ | 0.93 | $L_4$, $C_4$, $R_{p4}$, $R_{load}$ |
| $F_1$ | 7.64 MHz | $L_1$, $C_1$ | $F_4$ | 7.64 MHz | $L_4$, $C_4$ |
| $K_{12}$ | 0.1376 | Measurement 2T; $L_1$, $C_1$, $R_{p1}$ | $K_{34}$ | 0.1343 | Measurement 2R; $L_4$, $C_4$, $R_{p4}$ |

TABLE S2-continued

MEASURED AND CALCULATED STATIC (NON-DISTANCE DEPENDENT) SYSTEM PARAMETERS

| TRANSMITTER | | | RECEIVER | | |
|---|---|---|---|---|---|
| COMPONENT | VALUE | SOURCE | COMPONENT | VALUE | SOURCE |
| $Q_2$ | 304.3 | Measurement 2T; $L_1, C_1, R_{p1}$ | $Q_3$ | 404.4 | Measurement 2R; $L_4, C_4, R_{p4}$ |
| $F_{o2}$ | 7.66 MHz | Measurement 2T; $L_1, C_1, R_{p1}$ | $F_{o3}$ | 7.62 MHz | Measurement 2R; $L_4, C_4, R_{p4}$ |
| $L_2$ | 39.1 uH | Calculation 1T | $L_3$ | 36.1 uH | Calculation 1R |
| $C_2$ | 11.04 pF | $L_2, F_{o2}$ | $C_3$ | 12.10 pF | $L_3, F_{o3}$ |
| $R_{p2}$ | 6.19 Ω | $L_2, F_{o2}, Q_2$ | $R_{p3}$ | 4.27 Ω | $L_3, F_{o3}, Q_3$ |

The experimental set-up showed that the system was able to perform adaptive frequency tuning for range-independent maximum power transfer. The lower frequency mode had a higher amplitude in the experimental set-up (partly because of the sign of the parasitic signals), so when splitting occurs, the lower mode was automatically selected. From this, the benefit of the frequency tuning is apparent at short range, because the frequency that was chosen for the non-adaptive case (7.65 MHz) was appropriate for the long range situation. However, if a different frequency had been chosen for the fixed case, the benefit could have been apparent at the longer ranges rather than the shorter range.

Note that increasing range and increasing angle mismatch both decrease $k_{23}$, and the range and orientation mismatch together diminish $k_{23}$ further; thus if the receiver had been further away, orientation adaptation would not have succeeded over such a wide range of angles. For extreme values of receiver angle, discussed further below, the coupling $k_{23}$ drops sufficiently that the system is no longer in the over-coupled regime, so there is no splitting and no change in optimal system frequency with coupling constant; thus the fixed and auto-tuning performance coincide.

Figure 3A:
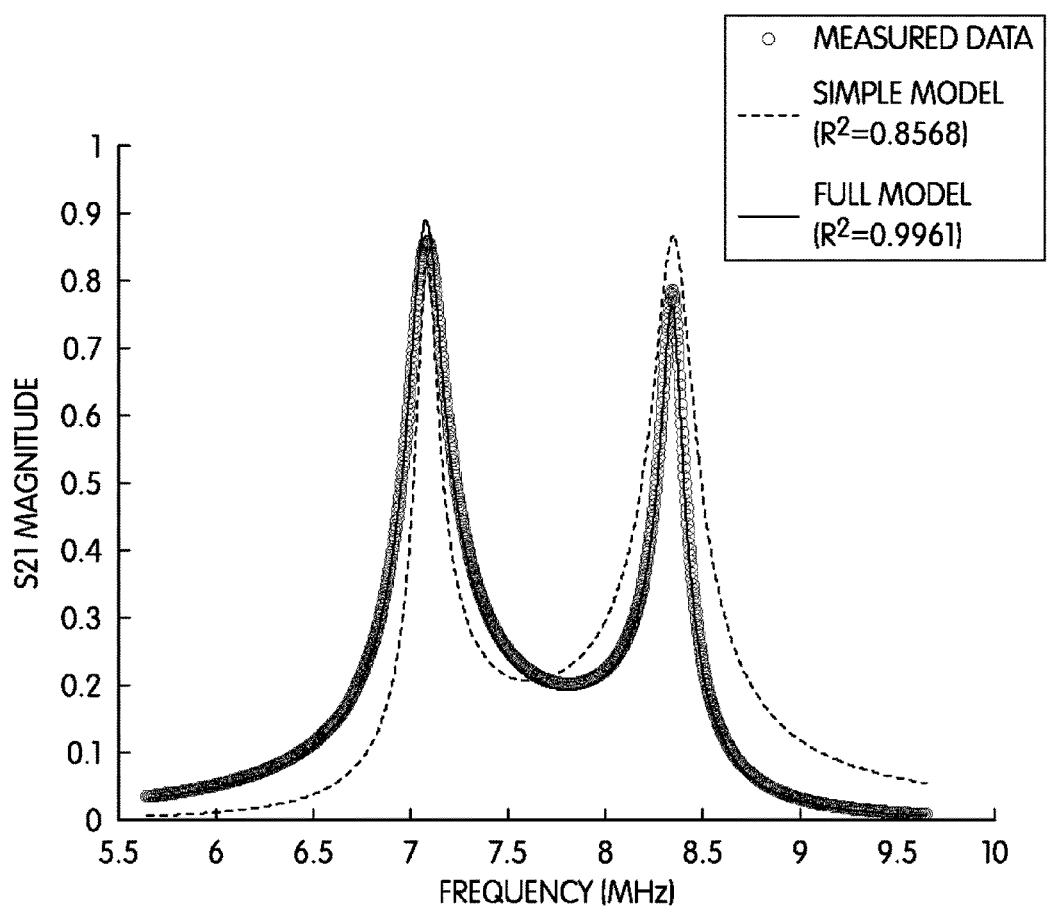
FIG. 3a shows a locally fit model comparing experimental data (black dots) to the elementary transfer function (dotted line), and to the complete transfer function (line), for the best fit value of $k_{23}$ in accordance with various aspects of the present disclosure.

FIG. 3a compares experimentally measured $|S_{21}|$ data to the simple model of Eq. 1, and to a more complete model that includes parasitic couplings. The Figure shows a comparison of experimental data (dots) to the elementary transfer function (dotted line), and to the complete transfer function (line), for the best fit value of $k_{23}$. The simple model neglects parasitic coupling and does not reproduce the amplitude difference between the upper and lower modes. The complete model reproduces this amplitude difference, which is explained by the phase of the parasitic (e.g. $k_{13}$) coupling terms relative to the non-parasitic terms (e.g. $k_{23}$) for the two resonant modes. The agreement between the complete model and the experimental data is excellent. The difference in the magnitude of the $|S_{21}|$ peaks for the upper and lower modes (in FIG. 3a visible in the experimental data and in the complete model, and not present in the elementary model) can be explained by considering the phase of the two modes.

Based on the dynamics of coupled resonators, the lower frequency mode that the current in the transmitter coil is expected to be approximately in phase with the current in the receiver coil; in the higher frequency mode, the coil currents are expected to be approximately anti-phase (180 degrees out of phase).

In the lower mode, in which the Tx coil and Rx coil are in phase, the parasitic feed-through from the drive loop to the Rx coil (associated with coupling constant $k_{13}$) contributes constructively to the magnitude of the current in the receive coil. In the upper mode, the Rx coil phase is inverted but the parasitic feed through is not, so the feed through interferes destructively with the Rx coil current. Similar arguments apply to the other parasitic couplings. The fact that the mode magnitude differences are modeled well only when parasitic couplings are included (as shown in FIG. 3a) supports this conclusion.

As disclosed above, other impedance-matching components such as discrete matching network or shielded transformer may be used to connect the source/load to the coils, eliminating inductively coupled loops. This would eliminate the cross coupling term and simplify the model, and possibly also simplify system construction. On the other hand, the parasitic feedthrough benefits system performance in the lower mode, and this benefit will be lost by eliminating the loop.

Figure 3B:
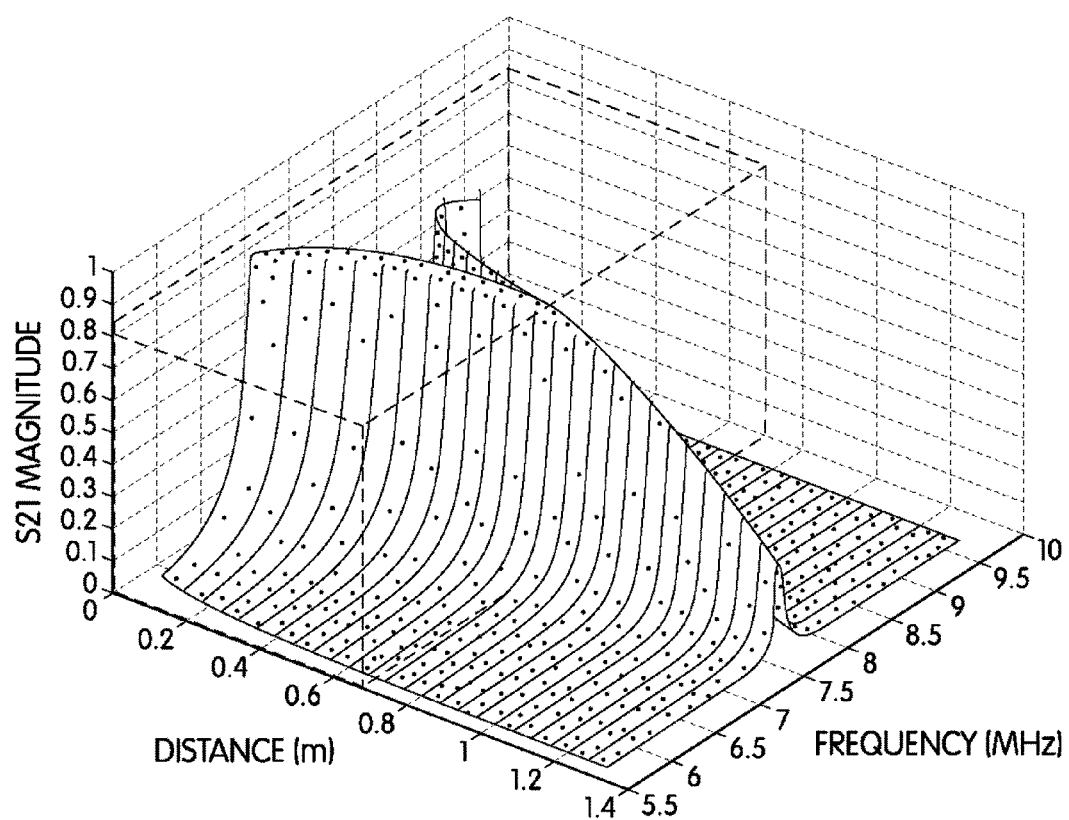
FIG. 3b shows a locally fit model comparing experimental S21 magnitude data (black dots) and analytical model (surface) computed from the complete transfer function, both plotted versus frequency and Tx-Rx distance in accordance with various aspects of the present disclosure.

FIG. 3b shows experimental data and the theoretical model, using coupling coefficients extracted separately for each distance. Experimental S21 magnitude data (dots) and analytical model (surface) computed from the complete transfer function, both plotted versus frequency and Tx-Rx distance. Note that each distance slice in the analytical surface is for an independently fit value $k_{23}$. As discussed above, the dotted box encloses the over-coupled region. For distances between experimental measurements (i.e. between the contours), $k_{23}$ values were interpolated linearly from neighboring $k_{23}$ values. Results using $k_{23}$ computed directly from geometry are presented in the FIGS. 4a, 4b and 4c discussed below.

Figure 4A:
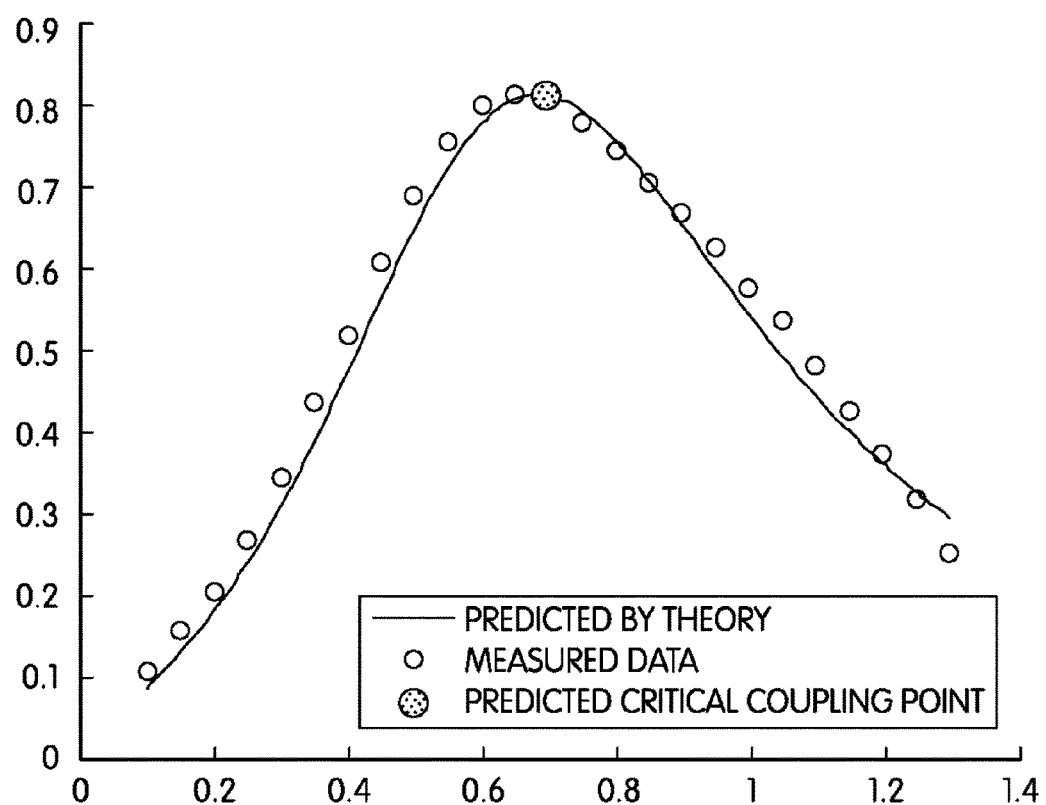
FIG. 4a shows a model (lines) compared to experimental data (black circles), with $k_{23}$ values calculated from geometry (not fit to data) where $|S_{21}|$ is plotted vs distance in accordance with various aspects of the present disclosure.
Figure 4B:
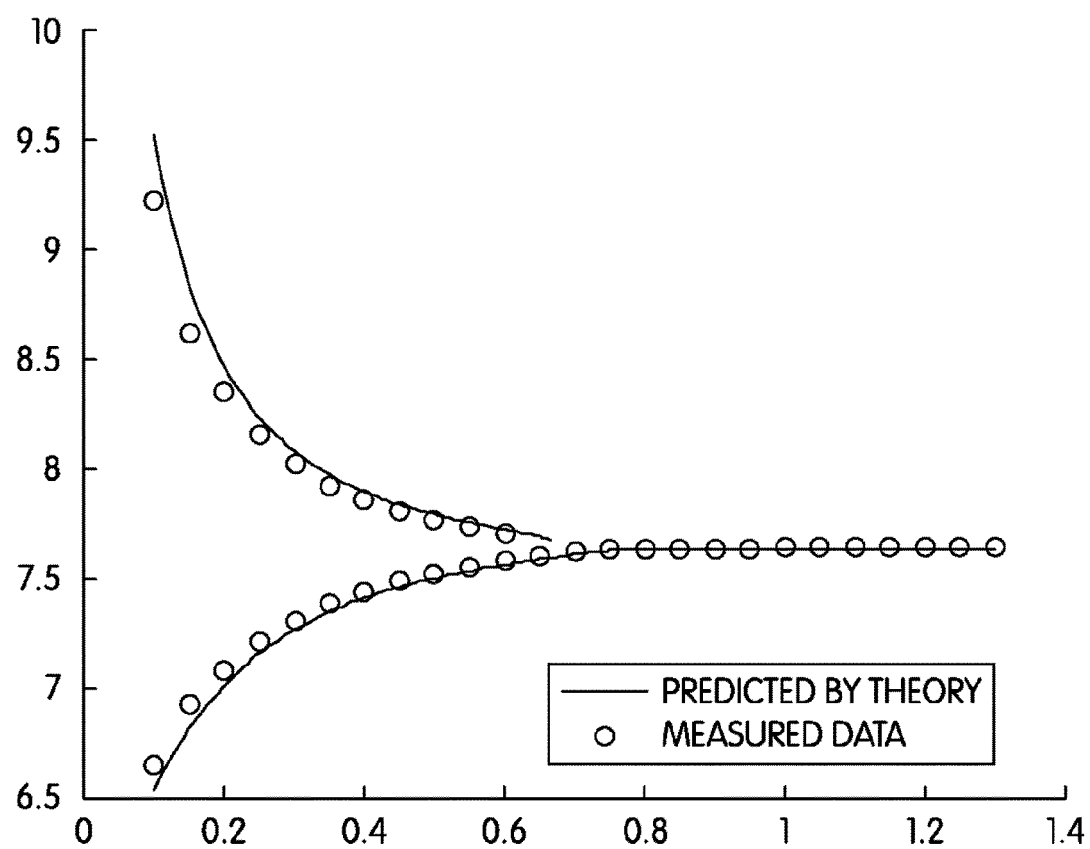
FIG. 4b shows the model of FIG. 4a where resonant peak locations are plotted as a function of distance in accordance with various aspects of the present disclosure.
Figure 4C:
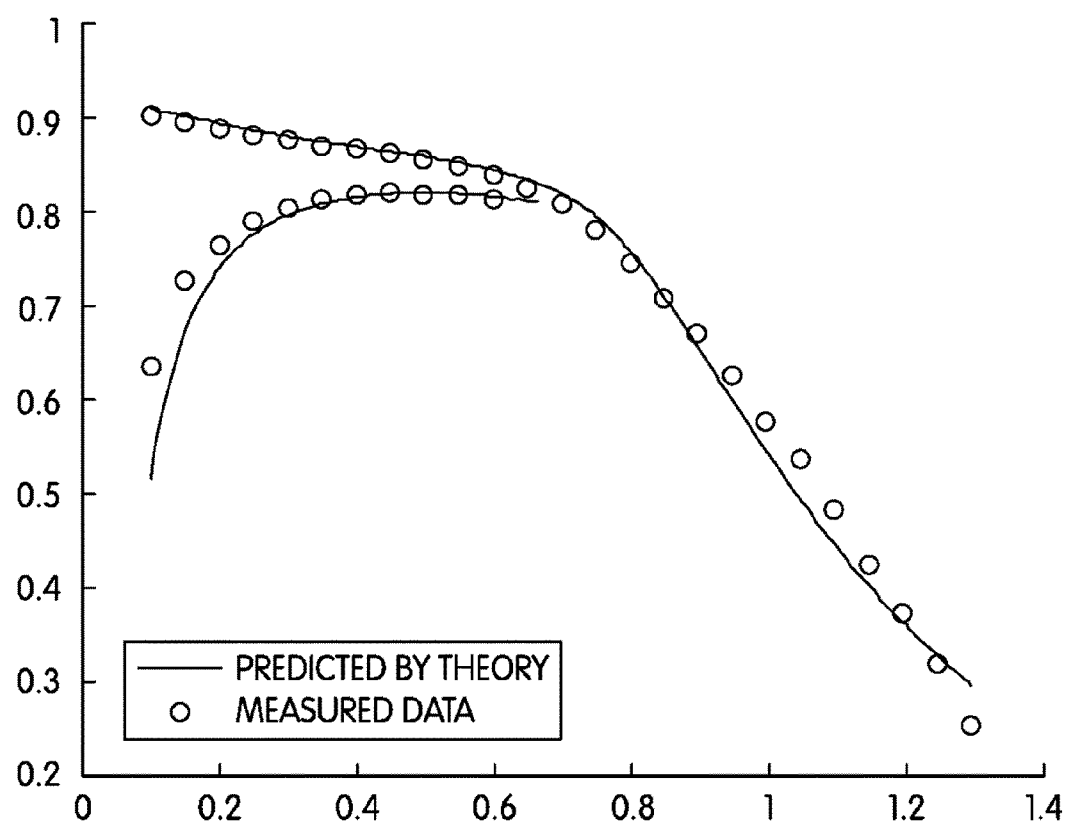
FIG. 4c shows the model of FIG. 4a where resonant peak magnitudes are plotted as a function of distance in accordance with various aspects of the present disclosure.

FIGS. 4a, 4b and 4c compare experimental data to the model, using only calculated coupling coefficients in the model. The model (lines) compared to experimental data (circles), with $k_{23}$ values calculated from geometry (not fit to data). FIG. 4a shows $|S_{21}|$ vs distance. Predicted maximum coupling point is plotted as a solid dot. FIG. 4b shows resonant peak locations as a function of distance. Frequency splitting is apparent below a critical distance. This plot can be thought of as the ridge lines of FIG. 3b viewed from above. FIG. 4c shows resonant peak magnitudes as a function of distance. This plot can be thought of as the ridge lines of FIG. 3b viewed from the side. In the simple model, these two branches would have the same magnitude; including parasitic couplings accounts for the magnitude difference between the modes.

In FIGS. 4a, 4b and 4c, only the static system parameters were measured; the dynamic (distance-dependent) parameters were calculated. The agreement is generally good, although at close range the numerical calculations become less accurate. This may be because capacitive coupling effects, which were not modeled, become more significant at close range.

Figure 6A:
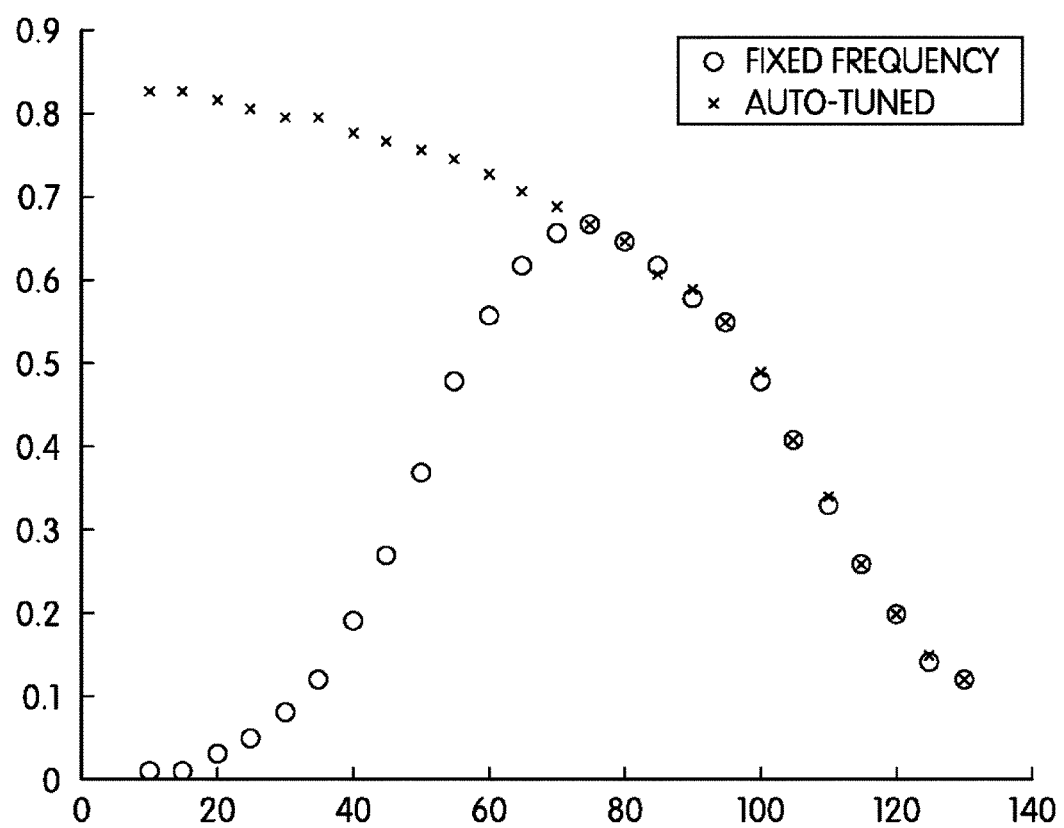
FIG. 6a shows an experimental implementation where tuning frequency compensates for range changes in accordance with various aspects of the present disclosure.
Figure 6B:
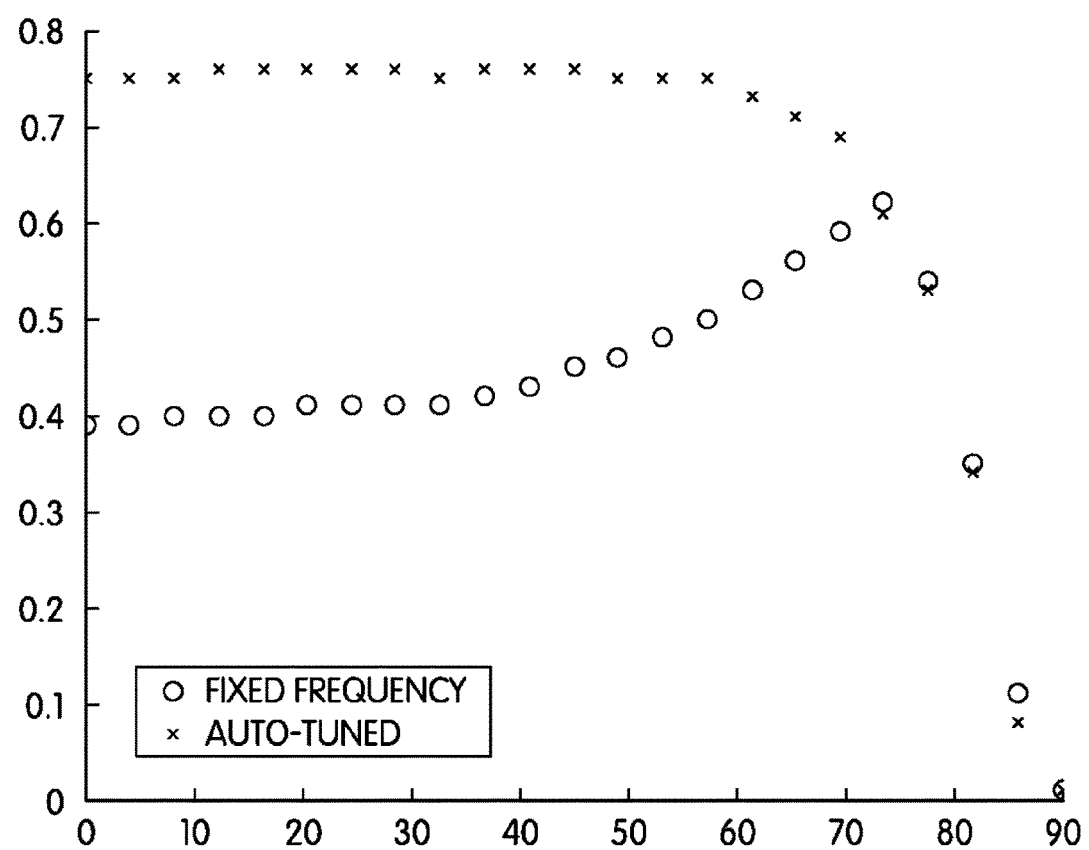
FIG. 6b shows the experimental implementation of FIG. 6a where tuning frequency compensates for orientation changes in accordance with various aspects of the present disclosure.
Figure 6C:
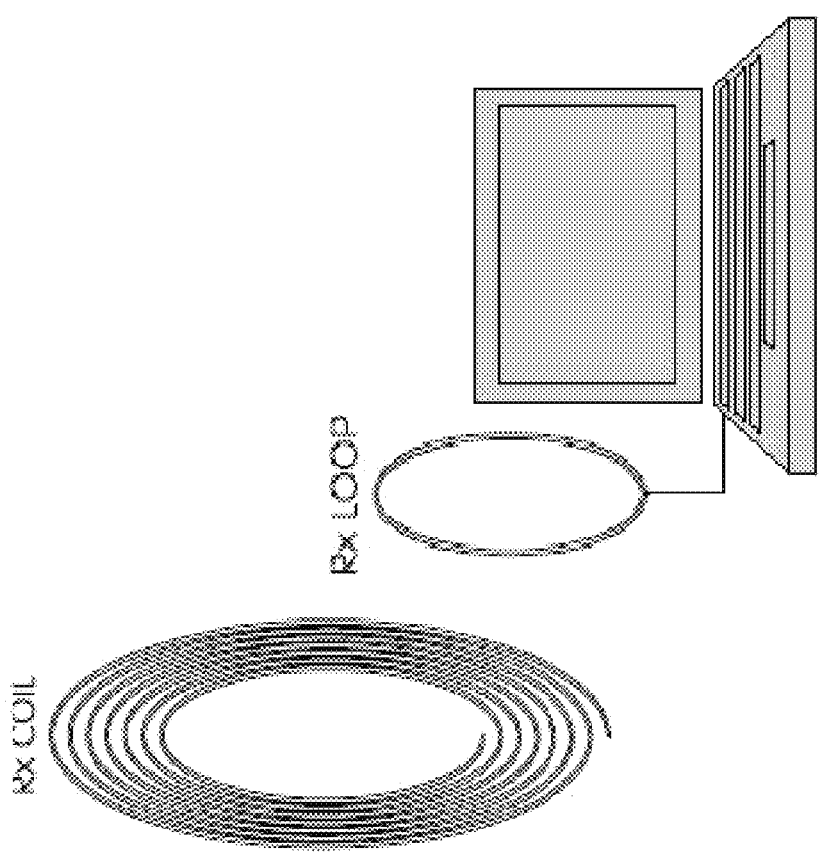
FIG. 6c shows the experimental implementation of FIG. 6a where a laptop computer is powered wirelessly in accordance with various aspects of the present disclosure.

Adaptive frequency tuning may be implemented for range-independent maximum power transfer. When the system is mis-tuned, for example when a non-optimal frequency is chosen, the impedance mis-match causes a reflection at the transmitter side; when the system is optimally tuned, the ratio of reflected to transmitted power is minimized. Thus if the transmitter is capable of measuring $S_{11}$, and adjusting its frequency, it can choose the optimal frequency for a particular range or receiver orientation by minimizing $S_{11}$ (that is, minimizing reflected and maximizing transmitted signals). FIGS. 6a and 6b shows experimental data for power transfer efficiency from a non-adaptive (fixed frequency) system compared with efficiency data from a working frequency auto-tuning system.

For each distance, the system swept the transmit frequency from 6 MHz to 8 MHz and then chose the frequency with minimal $|S_{11}|$ to maximize efficiency. At the optimal frequency for each distance, the power delivered into a power meter was measured. The range of tuned values was 6.67 MHz to 7.66 MHz. Analogous results are shown in FIG. 6b for receiver orientation adaptation. The system efficiency is nearly constant over about 70 degrees of receiver orientation. Only in the range from 70 to 90 degrees does the power transfer efficiency fall toward zero. In both cases shown in FIGS. 6a and 6b, the fixed frequency chosen was the single coil resonant frequency (i.e. the undercoupled system frequency), so as the system leaves the overcoupled regime, the auto-tuned frequency coincides with the fixed frequency, and so the efficiencies coincide as well.

Figure 7:
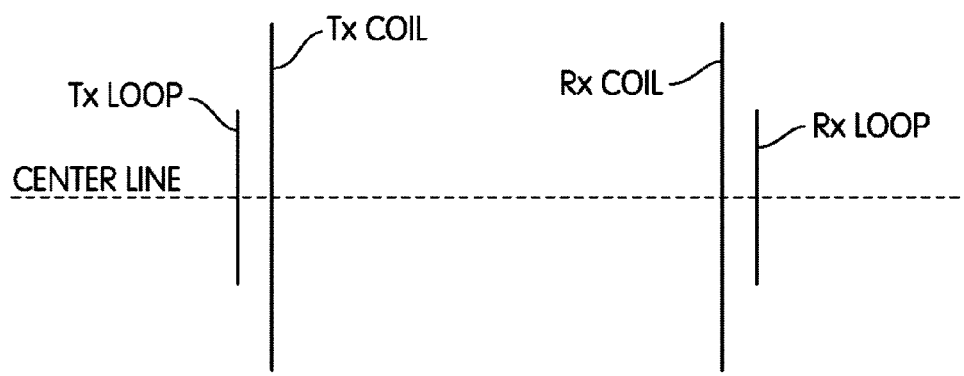
FIG. 7 shows a representative top view of the experimental implementation of FIG. 6a illustrating the varying orientation of the receiver (Rx Coil and Rx Loop) in accordance with various aspects of the present disclosure.
Figure 7:
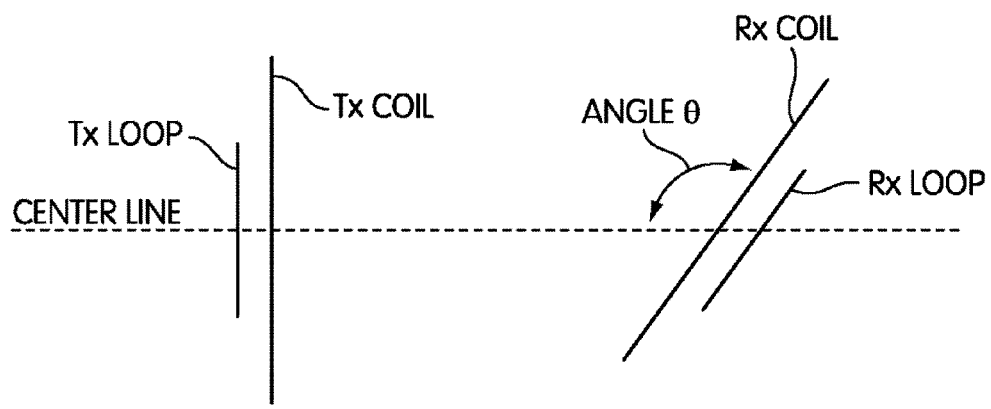

FIG. 7 shows a representative top view of the experimental implementation of FIG. 6a illustrating the varying orientation of the receiver (Rx Coil and Rx Loop) in accordance with various aspects of the present disclosure. As seen in the top of FIG. 7, Rx Coil and Rx Loop are aligned in orientation with Tx Loop and Tx Coil along a center line. The boom of FIG. 7 shows Rx Coil and Rx Loop rotated through an angle θ with respect to the center line. When the Rx Coil and Rx Loop are arranged as in the top of the Figure, θ=0°. If Rx Coil and Rx Loop were arranged parallel to the center line, then θ=90°.

A tracking scheme that is able to keep the system in tune if the receiver is moved sufficiently slowly and an adaptation techniques for narrowband operation are disclosed. Rather than considering $k_{lc}$ to be a static design parameter to be optimized (as above), $k_{lc}$ may be consider as a dynamically variable impedance matching parameter that can enable range adaptation without frequency tuning. If the system is driven at $\omega_0$ (the un-coupled resonant frequency) even though it is actually over-coupled ($k_{23} > k_{Critical}$), frequency splitting will result in the system being off resonance, and little to no power will be transferred. To bring the efficiency of the system back to a maximum, $k_{lc}$ can be decreased, causing $k_{Critical}$ in Eq. 4 to decrease, until $k_{23} = k_{Critical}$, at which point maximum power transfer can resume. The inventors has we have successfully implemented a form of this tuning method in laboratory demonstration systems that allows tuning for a variety of Tx-Rx distances ($k_{23}$ values) with a hand adjustment of a loop that can be rotated about its coil, changing $k_{lc}$. The $k_{lc}$ adaptation method has the advantage of allowing operation at a single frequency $\omega_0$, which would be advantageous for band-limited operation. Thus, it is of practical interest to develop electronically controllable techniques for $k_{lc}$ tuning. As noted earlier, the system's loops could be replaced by discrete matching networks; making these matching networks electronically variable could allow automatic $k_{lc}$ tuning.

By way of a non-limiting example of the tracking and tuning scheme, a value of a loop-to-coil coupling coefficient of the transmitter resonator may be fixed and a frequency may be tune adaptively to choose a desired frequency for a particular value of a transmitter resonator coil-to-receiver resonator coil coupling coefficient. Reflected power may be monitored by the transmitter, for example, and a frequency of the transmitter resonator can be adjusted to minimize the reflected power. In some aspects, the transmitter resonator may sweep through a range of frequencies until the transmitter resonator receives a feedback signal from the receiver resonator. A desired frequency may be determined for a distance between the transmitter resonator and the receiver resonator based on the received feedback signal. The feedback signal may include signals such as a radio signal, WiFi, Bluetooth, Zigbee, RFID-like backscatter, or a load-modulated signal. The load-modulated signal may be modulated on a carrier signal of the transmitter resonator. In some aspects, a desired frequency may be determined for a distance between the transmitter resonator and the receiver resonator based on an impedance matching value between a signal source and a coil of the transmitter resonator.

As discussed above, the coupled resonator wireless power transfer system is capable of adapting to maintain optimum efficiency as range and orientation vary. This is practically important, because in many desirable application scenarios, the range and orientation of the receiver device with respect to the transmit device varies with user behavior. For example, a laptop computer being powered by a coil embedded in the wall of a cubicle would have a different range and orientation each time the user repositioned the device. One feature of the disclosed adaptation scheme is that the error signal for the control system can be measured from the transmitter side only. A separate communication channel to provide feedback from the receiver to the transmitter may not be required.

In some aspects, it is desirable to optimally power smaller size devices, such as hand held devices and scale the power transmitted based on the device size. Powering devices that are smaller than the transmitter is a case of practical interest: consider a computer display or laptop that recharges a mobile phone. The dependence of range on receiver coil size can be discussed by presenting the asymmetric form of Eq. 4, where the critical coupling (where asymmetric means that it is possible that $k_{12} \neq k_{34}$, $Q_1 \neq Q_4$, and $Q_2 \neq Q_3$):

$$k_{Critical} = \sqrt{\frac{(1 + k_{12}^2 Q_1 Q_2)(1 + k_{34}^2 Q_3 Q_4)}{Q_2 Q_3}} \leq 1 \qquad (8)$$

For completeness an asymmetric form of Eq. 5 can be shown to be:

$$|S_{21}|_{Critical} = \frac{k_{12} k_{34} Q_1 Q_4 R_{Load}}{k_{Critical} \sqrt{L_1 L_4} \, \omega_0} \qquad (9)$$

Figure 8:
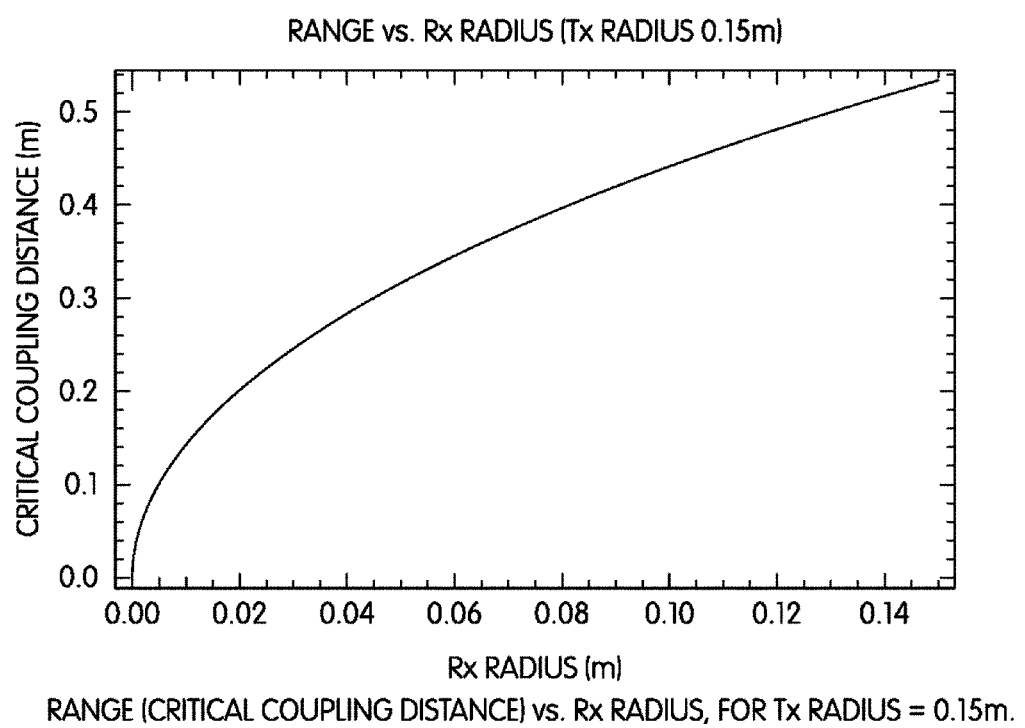
FIG. 8 shows a plot of range (critical coupling distance) vs. Rx radius, for Tx radius=0.15 m.

Insight into the scaling of range with coil sizes can be gained by starting from an approximate formula for coupling coefficient linking two single-turn coils. Although the coils as tested had five turns, the behavior is expected to be qualitatively similar. The formula assumes that the receive radius is less than the transmit radius ($r_{Rx} < r_{Tx}$) and that both are on-axis: $k(x) \approx r_{Tx}^2 r_{Rx}^2 (r_{Tx} r_{Rx})^{-1/2} (x^2 + r_{Tx}^2)^{-3/2}$. The distance of critical coupling (which measures range) can be solved as:

$$x_{Critical} = \left(\left(\frac{r_{Tx}}{k_{Critical}^{2/3}} - r_{Rx}\right)r_{Rx}\right)^{1/2} \quad (10)$$

into which the right hand side of Eq. 8 can be substituted. Substituting the measured values from Table S2 above into the right hand side of Eq. 8, substituting the resulting $k_{Critical}$ into Eq. 10, and assuming $r_{Tx}$=30 cm, plot Eq. 10 is plotted in FIG. 8. According to this plot, it may be possible to power a device of radius 5 cm from a transmitter of radius 15 cm at a range of about 30 cm. This parameter set may support the charging of a cell phone from a wireless power transmitter in a laptop computer.

In some aspects, Tx Coil and/or Rx Coil may be arranged as substantially flat or planar in design. In addition to improving integration with smaller and more planar-sized structure such as a laptop, a flat coil structure can also reduce unwanted spurious radio frequency (RF) emissions, because the substantially flat coil will have a smaller dipole moment in the direction perpendicular to the flat coil.

In some aspects, flat coils may be fabricated by forming a suitable number of turns of magnet wire, solid core wire, stranded wire, Litz wire, hollow copper tubing (producing better weight to conductivity ratio) on a non-conductive substrate or armature that maintains the appropriate flat geometry. Moreover, other methods of manufacturing a multi-turn 2D coil may be used including etched or otherwise patterned conductors and those manufactured by any methods used in printed circuit board fabrication.

In the embodiments herein, the apparatus could be manufactured by semiconductor device fabrication methods such as deposition, removal, patterning, and modification of electrical properties. Deposition methods, for example, include physical vapor deposition (PVD), chemical vapor deposition (CVD), electrochemical deposition (ECD), molecular beam epitaxy (MBE) and, atomic layer deposition (ALD) among others. Removal methods, for example, include wet etching, dry etching, chemical-mechanical planarization (CMP) among others. Patterning methods, for example, include lithography among others. Modification methods, for example, include reduction of dielectric constant via exposure to ultraviolet light in UV processing (UVP) among others.

Dielectric losses due to the armature materials may be minimized by eliminating all excess material not required for structural stability. The armature may be laser cut from acrylic or plastic, or injection molded plastic. The substrate may also be glass, plexiglass, Flame Retardant 4 (FR4), silicon, low-loss printed circuit board material, flexible printed circuit board material, polyamide, polycarbonate sold by, for example, Honlex Flexible PCB Industrial Co. Ltd of Taiwan.

Substantially flat coils for wireless power transfer may be fabricated by standard printed circuit board (PCB) fabrication methods: traces can be designed in standard CAD programs such as Altium Designer. Wider traces and thicker copper produce higher conductivity values, which provides for better resonator quality factor (Q), which in turn is a determinant of system range and efficiency. The resonator frequency is given by $f=1/(2\pi(LC)^{1/2})$; the resonator quality factor is given by $(1/R)(L/C)^{1/2}$. More turns provides additional inductance, which improves Q if C can be decreased to keep the desired resonant frequency f constant. At some point, the capacitance C can be decreased no further however, limiting the maximum inductance value that can be used for a particular resonant frequency f. An additional factor limiting the number of turns is that increased trace length increases resistance, which decreases Q. The need to increase L by using more turns limits the width of the traces. Balancing these factors has led the inventors to a design with around 6 turns, for operating frequencies in the range 5 MHz to 15 MHz.

Coils for wireless power transfer may also be fabricated using flexible printed circuit board (PCB) methods. Because the flexible PCB substrates are thinner than conventional circuit boards, they may be expected to cause less dielectric loss. PCB substrates made from low dielectric loss materials such as that from Rogers corporation may also be used to reduce dielectric losses. In a micro-electrical-mechanical systems (MEMS) process such as lithography, electroforming and molding (LIGA), thick (high aspect ratio) metal coils (which may be expected to have higher conductivity) may be fabricated on a silicon substrate.

The flat coils may also be fabricated by die stamping sheet metal; cutting metal foil using a vinyl cutter or similar tool; patterning metal using a waterjet, laser cutter, or saw. Flat coils may be fabricated from transparent conductors such as Indium Tin Oxide (ITO) or other Transparent Conductive Material.

Flat coils on the interior of a laptop lid may be patterned by screen printing, silk screening, stenciling, inkjet printing, or other processes capable of printing conductive materials.

The performance of the coils fabricated by several of the methods above can be improved by plating the materials with a higher conductivity, non-oxidizing materials such as silver, gold, or platinum. The coil performance can also be improved by increasing the amount or thickness of conductive material by electroplating or electroless plating (even if the plated material is not particularly high conductivity). The flat coils may be designed to receive power from outside the laptop, and shield emissions from inside. The outline of the 2-D coil is not limited to a specific shape and can adapt to mobile device design considerations, such as circular, rectangular, square or any other arbitrary shape in outline.

As discussed above, when the wireless power system is not optimally tuned, large reflections will be generated at the transmitter. It is desirable to avoid large power reflections at the transmit side to minimize size and cost of the transmitter. If significant power is reflected on the transmitter, bulky and costly power dissipation system is required, thermal burden is increased, and additional protection circuitry may be necessary. Additionally, the reflected power is typically lost as dissipated heat, reducing the net efficiency of the system.

Frequency-based tuning for the purpose of range or orientation adaptation can be used for optimally tuning, where the frequency-based tuning is accomplished by adjusting the frequency to minimize the transmit-side reflections, thereby maximizing power throughput. Alternatively, tuning of the loop-to-coil coupling, Klc, may be used in a similar fashion instead of frequency tuning.

When the system is critically coupled or over-coupled (i.e. when it is in the "magic regime"), if it is optimally tuned (by frequency, Klc, or load tuning), in principle, no reflection will be generated at the transmit side. When the system is undercoupled, then even when system parameters are chosen to optimize power transmission, there will still be substantial reflections on the transmit side.

Figure 9:
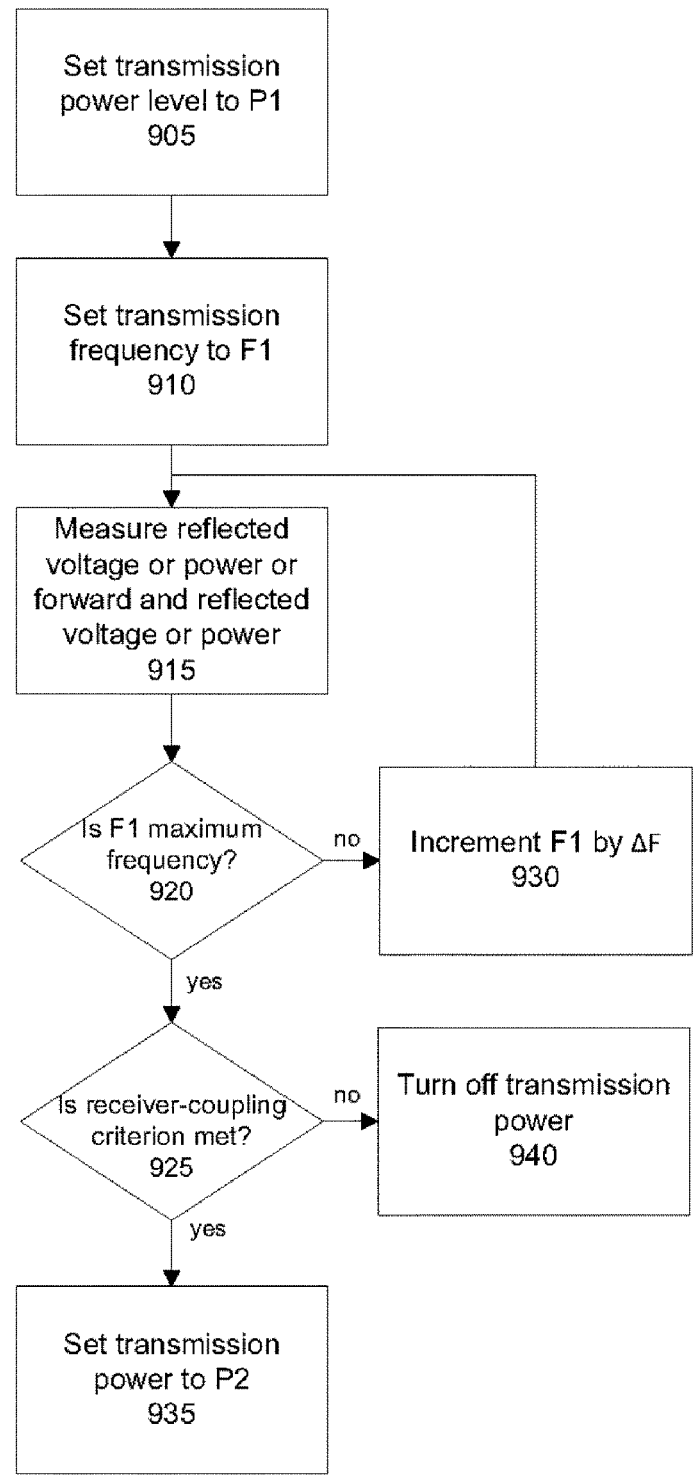
FIG. 9 shows an example flow chart of an auto-tuning process for wireless power systems in accordance with various aspects of the present disclosure.

FIG. 9 shows an example flow chart of an auto-tuning process for wireless power systems in accordance with various aspects of the present disclosure. In this process, the auto-tuning wireless power system is configured to adjusts transmit-side amplitude, instead of just frequency (or Klc, or other tuning parameters). This allows the system to only transmit at high power levels when substantial reflections will not occur at the transmit side, e.g. only when one or more receiver devices are present and when the coupling to one or more receivers is sufficiently high to meet maximum reflected power threshold criterion.

In general, the method for maintaining efficient operation of the system includes sweeping the transmission frequency and measuring both forward and reflected power to identify a resonant frequency or frequencies where peak efficiency can be achieved. At off-resonant frequencies, however, significant power is reflected at the transmit side, incurring the potential penalties described above. It is therefore desirable to perform such a frequency sweep at a low power level to minimize the reflected power experienced by the transmit side during this procedure.

At 905, the transmitter can generate a low power level signal or "pilot tone." In this configuration, $k_{lc}$ or load tuning is used instead of frequency tuning where the system operates at a single frequency. The ratio of the reflected to transmitted power can be used to determine whether a receiver is present or sufficiently close or in a mode to accept power. Only when source-receiver coupling is sufficient would the high amplitude power signal be generated.

In some aspects, the transmitter can perform a frequency sweep at low power to determine whether or not to enable power transmission at a higher power level as shown at 910.

In some aspects, the low power frequency scan can occur simultaneously with the high power transmission as shown at 915. This enables the receiver device to experience a faster net charging time, since the high power transmission need not be interrupted to perform the frequency scan.

At 920, a determination is made as to whether a reflected signal is detected. In any of these three cases: (1) no receiver is present, or (2) no receiver is close enough to meet a reflected power threshold criterion, or (3) no receiver is close enough to be over-coupled, the system continues scanning periodically at the low power level. These conditions may be detected by the lack of resonance splitting; alternatively, the absence of a receiver may be detected by the absolute value of the S11 scattering parameter, which may be found by gradually increasing the TX amplitude until a threshold reflected value is reached.

If the result of the determination made at 920 is no, then the process loops back to 905 where transmitter is configured to periodically send the low power level signal. The period can be on the order of seconds, minutes or hours depending on the particular nature of the network, such the frequency in which receivers enter and leave the range of the transmitter. If the result of the determination made at 920 is yes, then one or more resonant frequencies are determined at 925. The transmitter can then transmit a high power signal at the one or more determined resonant frequencies at 930.

This amplitude tuning can prevent the system from wasting power and from being damaged by high-power reflections, because it never transmits at high power when no receiver is present. Avoiding large reflections also produces an increase in overall system efficiency (averaging over periods where a receiver is and is not present).

For example, suppose that a receiver is present, and close enough to be in the overcoupled regime. In this situation, if the system will use frequency tuning for range adaptation, then the optimal frequency can be selected based on the low power scan. With the optimal frequency selected, the transmit amplitude can then be increased to the level required for power transfer. The use of this low power receiver detection and tuning technique ensures that when the transmitter is brought into a high power state, it will experience the smallest possible reflections.

To the extent that the system is linear (and the loops and coils are indeed linear), one can superpose the different signals and analyze the system's response to each separately. While the system is delivering power at one frequency, a low power frequency sweep can occur simultaneously. If a more efficient frequency is detected with the low power scan, then the frequency of the high power signal can be changed to the best frequency found with the low power scan. If frequency tuning is not being used for power delivery, that is if the power is always delivered at a single frequency, the low power frequency scan can still be used to estimate the optimal tuning parameters for the high power system. The low power frequency scan would be used to identify an optimal frequency. This value can be mapped to an optimal Klc value. The optimal Klc value can then be commanded.

The simultaneous low power frequency sweep can provides several benefits. If one simply adjusts the transmit frequency by doing a local search (for example trying one frequency step below and above the current frequency, and choosing the best of these three), then the system will sometimes track the wrong (i.e. less efficient) of the two resonant peaks. In the prior art methods, one could avoid this "local minimum" problem by doing a global frequency scan at a high power level, but this takes time, which means that power is not being transmitted efficiently during the global scan. Thus the net power delivered drops. The simultaneous high amplitude power delivery and low power scan can ensure that the globally optimal tuning parameter is selected, without requiring an interruption in high power transmission.

If the receive device is only capable of using a certain amount of power, then any excess power that the transmitter attempts to supply may show up as reflections at the transmit side. The S11 reflection parameter is the ratio of reflected to transmitted power. If the receive system is consuming all additional power provided by the transmitter, then S11 will be constant even as the absolute transmit power level is increased. Once the receive side saturates, however, and is unable to accept additional power, then increasing the TX power level will produce an increase in TX-side reflections, which will be apparent as an increase in S11. Thus the TX can servo to the optimal power delivery point by increasing power transmitted as long as S11 remains constant; once S11 increases, the TX can lower its transmitted power. (This discussion assumes that the system aims to transmit the maximum power possible at high efficiency. It is also possible that other constraints dominate, for example, there can be a maximum tolerable absolute reflected power level. If so, then the transmitted power can be increased until either the absolute reflected power threshold is exceeded, or until S11 increases.)

Moreover, the cases of "receiver out of range" and "receiver in range but saturated" can be distinguished in two ways, one using TX amplitude scanning and one using TX frequency scanning. Both situations could correspond to mismatch, and thus potentially the same large absolute reflection value or S11 value. In the "out of range" case, S11 will be constant for all choices of TX amplitude, including very low TX amplitude. In the "receiver saturated" case, S11 will be constant for low amplitudes, and rise as the receiver enters saturation. When the receiver is out of range, no frequency splitting will occur. Thus the receiver could be detected by doing a frequency scan (possibly at low power) to look for splitting. This frequency scanning technique could be used for receiver detection (or more generally, range estimation) even if power will only be delivered at a single frequency.

FIG. 9 shows an example flow chart of an auto-tuning process for wireless power systems in accordance with various aspects of the present disclosure. In this process, the auto-tuning wireless power system is configured to intelligently adjusts transmit-side amplitude, instead of just frequency (or $k_{lc}$, or other tuning parameters). This allows the system to only transmit at high power levels when substantial reflections will not occur at the transmit side, e.g. only when one or more receiver devices are present and when the coupling to one or more receivers is sufficiently high to meet maximum reflected power threshold criterion.

At 905, the transmitter is set to transmit power at a first power level, $P_1$. At 910, the transmitter is set to transmit the power at a first frequency, $F_1$. At 915, a time signal is measured, which is indicative of a receiver coupling criteria. The receiver coupling criteria can include a reflected voltage wave amplitude, a ratio of the reflected voltage wave amplitude to a forward voltage wave amplitude, a reflected power, or a ratio of the reflected power to a forward power. At 920, a determination is made as to whether the first frequency $F_1$ is a maximum frequency. If the result of the determination at 920 is yes, then a determination is made as to whether the receiver coupling criterion is met at 925. If the result of the determination at 920 is no, then the first frequency $F_1$ is incremented by $\Delta F$ at 930, and the process loops back to 915. If the result of the determination at 925 is yes, then the transmission power is set to a second power level, $P_2$, at 935. If the result of the determination at 925 is no, then the transmitter is turned off at 940.

Figure 10:
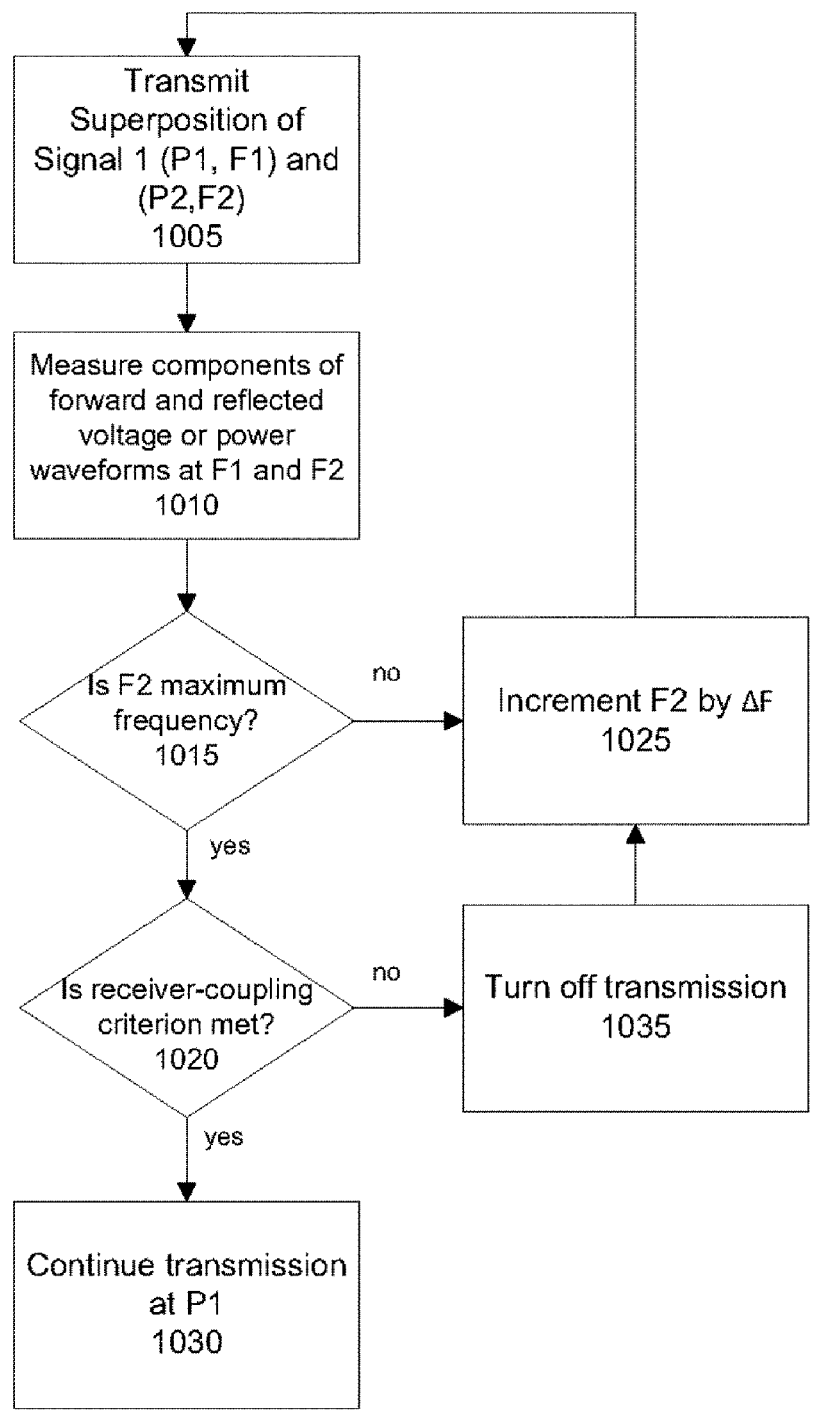
FIG. 10 shows another example flow chart of an auto-tuning process for wireless power systems in accordance with various aspects of the present disclosure.

FIG. 10 shows another example flow chart of an auto-tuning process for wireless power systems in accordance with various aspects of the present disclosure. At 1005, the transmitter is set to transmit the power at a superposition of a power signal at a first high power level, $P_1$, at a first frequency, $F_1$, with a power signal at a second low power level, $P_2$, at a second frequency, $F_2$. The second low power level signal is then swept from some first value, $F_{2START}$, to some second value, $F_{2STOP}$, with some step size, $\Delta F_2$. At 1010, a time signal is measured at the transmission antenna for each second frequency step size, which is indicative of a receiver coupling criteria. The receiver coupling criteria can include a reflected voltage wave amplitude, a ratio of the reflected voltage wave amplitude to a forward voltage wave amplitude, a reflected power, or a ratio of the reflected power to a forward power. For each second frequency step, the components of the measured signal are separated into first component, $M_1$, corresponding to the first high power signal, $P_1$ at the first frequency, $F_1$, and a second component, $M_2$, corresponding to the second low power signal, $P_2$, at the second frequency, $F_2$. In some aspects, the measured signal is separated into components, $M_1$ and $M_2$, using a demodulation circuit where the measured signal, M, is separately multiplied by an amplitude-scaled version of the $P_1, F_1$ signal and the $P_2, F_2$ signal and each resulting signal is subsequently low-pass filtered to result in $M_1$ and $M_2$, respectfully. This aspect is shown and described in greater detail in FIGS. 11 and 12. In some aspects, the measured signal is separated into components, $M_1$ and $M_2$, by taking a frequency transform of the measured time signal and isolating the components of the signal corresponding to a frequency band around $F_2$. This aspect is shown and described in greater detail in FIG. 13.

Turing back to FIG. 10, a determination is made as to whether the second frequency, $F_2$, is a maximum frequency at 1015. If the result of the determination at 1015 is yes, then a determination is made as to whether the receiver coupling criterion is met at 1020. If the result of the determination at 1015 is no, then the second frequency, $F_2$, is incremented by $\Delta F_2$ at 1025, and the process loops back to 1005. If the result of the determination at 1020 is yes, then the transmitter continues to transmit power at the first power level, $P_1$, at 1030. If the result of the determination at 1020 is no, then the transmitter is turned off at 1035. The process can loop back to 1025 where the second frequency, $F_2$, is incremented by $\Delta F_2$, and then loop back to 1005.

In some aspects, as the power transmitted by the transmitter is swept across a plurality of frequencies, more than one frequency or range of frequencies may exist where the transmitter-to-receiver coupling may be acceptable between the transmitter and the one or more receivers. In this instance, the transmitter can be configured to transmit power at a "best" frequency within the range of acceptable frequencies. This "best frequency" can be tuned to another "best" frequency if the system parameters, such as movement of the transmitter or receiver, change.

Figure 11:
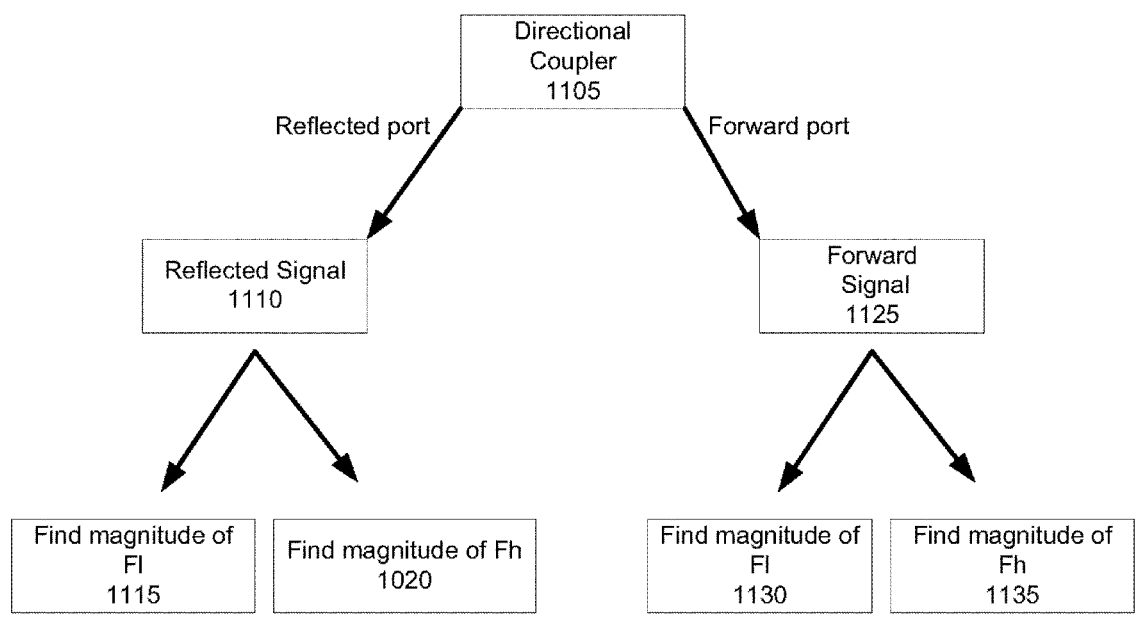
FIG. 11 shows a general representation of a signal flow diagram of the auto-tuning process of FIG. 10.

FIG. 11 shows a general representation of a signal flow diagram of the auto-tuning process of FIG. 10. A directional coupler 1105 is configured to receive a small-signal version of a high amplitude RF signal at some frequency $F_1$ and a small-signal version of a low amplitude RF signal at some frequency $F_2$. A reflected signal 1110 is measured emerging from a reflected port of the directional coupler 1105. A magnitude of $F_1$ is determined at 1115 and a magnitude of $F_2$ is determined at 1120. Likewise, a forward signal 1125 is measured emerging from a forward port of the directional coupler 1105. A magnitude of $F_1$ is determined at 1130 and a magnitude of $F_2$ is determined at 1135. In some aspects, the determination at 1115, 1120, 1130 and 1135 can be performed using analog components, as shown in FIG. 12, or by using digital components, as shown in FIG. 13.

Figure 12:
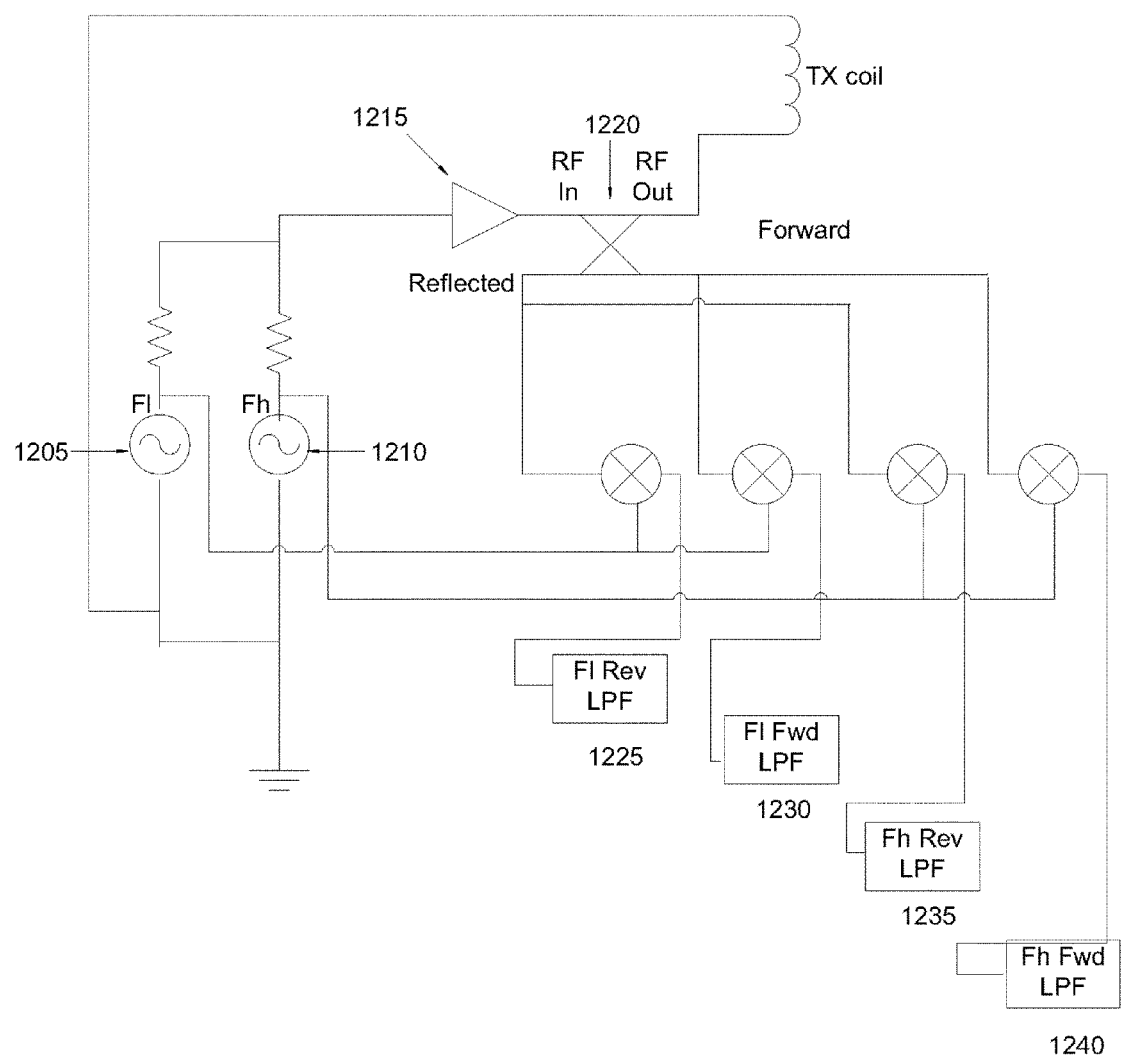
FIG. 12 shows an example schematic representation of an analog demodulation scheme that enables transmitting a high amplitude signal while simultaneously performing a low-amplitude frequency sweep.

FIG. 12 shows an example schematic representation of an analog demodulation scheme that enables transmitting a high amplitude signal while simultaneously performing a low-amplitude frequency sweep. The example demodulation scheme can be used to determine optimum operating conditions without interrupting power delivery service. In the Figure, a first RF source 1205 is configured to produce a small-signal version of a high amplitude RF signal at some frequency, $F_1$, and a second RF source 1210 is configured to produce a low amplitude RF signal, at some frequency, $F_2$, that is supplied to an amplifier 1215. A directional coupler 1120 is configured to receive the amplified signal from the amplifier 1215. The directional coupler 1220 is also configured to take a small-signal version of the forward and reverse (or reflected) RF signals. The RF out signal, at the top of the directional coupler 1220, powers the transmit-side coil. The small-signal version of the reflected signal is multiplied separately by each of the two frequencies, $F_1$ and $F_2$, and then the resulting signal is filtered 1225, 1230, 1235 and 1240 (low-pass filtered) to result in a reflected signal corresponding to the first, high-amplitude, RF source 1205 and the first, high-amplitude, reverse (or reflected) low-pass filtered signal and a reversed (or reflected) signal corresponding to the second, low-amplitude, RF source 1215 and the second, low-amplitude, reversed (or reflected) low-pass filtered signal.

Figure 13:
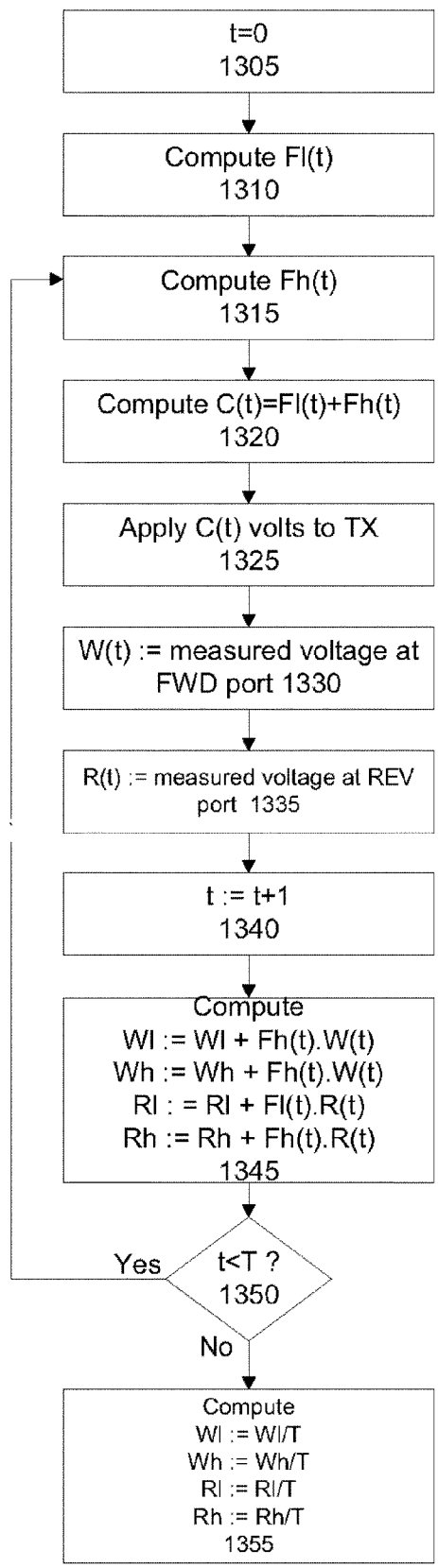
FIG. 13 shows an example process of a digital demodulation scheme using a digital signal processor (DSP).

FIG. 13 shows an example process of a digital demodulation scheme using a digital signal processor (DSP). In some aspects, the DSP can be implemented by computing a Fourier transform, and taking the magnitude of the desired frequency bins. Alternatively, the DSP can be implemented by directly computing the frequency bins of interest. Turning now to FIG. 13, the process begins at 1305, where t is set equal to 0. At 1310, $F_2(t)$ is computed and at 1315, $F_1(t)$ is computed. At 1320, the sum, $C(t)$, of $F_2(t)$ and $F_1(t)$ is computed. At 1325, $C(t)$ in volts is applied to the transmitter coil, Tx. At 1330, the voltage at the forward port of the directional coupler 1120, $W(t)$ is measured. At 1335, the voltage at the reverse port of the directional coupler 1120, $R(t)$, is measured. At 1340, the time, t, is increased by 1. At 1345, the following values are computed: $W_2$, $W_1$, $R_2$ and $R_1$ according to the following: $W_2 = W_2 + F_1(t) \cdot W(t)$; $W_1 = W_1 + F_1(t) \cdot W(t)$; $R_2 = R_2 + F_2(t) \cdot R(t)$; and $R_1 = R_1 + F_1(t) \cdot R(t)$, where the operation denoted by "·" represents scalar multiplication. At 1350, a determination is made as to whether t<some threshold, T. If result of the determination at 1350 is no, then the process returns to 1315. If result of the determination at 1350 is yes, then the following values are computed at 1355: $W_2$, $W_1$, $R_2$ and $R_1$ according to the following: $W_2 = W_2/T$; $W_1 = W_1/T$; $R_2 = R_2/T$; and $R_1 = R_1/T$.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A method comprising:
    transmitting power from a transmitter of a wireless power system at a multiplicity of frequencies between a first transmission frequency and a second transmission frequency at a first power level;
    measuring a signal at each transmission frequency at an antenna of the transmitter;
    determining whether one or more receiving devices are coupled to the transmitter based on the measured signal including if a number of local minima of the measured signal versus frequency is greater than or equal to 2; and
    transmitting power from the transmitter at a second power level and at one or more frequencies between the first transmission frequency and the second transmission frequency if the one or more receiving devices are determined to be coupled to the transmitter.

2. The method according to claim 1, wherein the measured signal is selected from the group consisting of: a reflected voltage wave amplitude, a ratio of the reflected voltage wave amplitude to a forward voltage wave amplitude, a reflected power, and a ratio of the reflected power to a forward power.

3. The method according to claim 1, wherein said determining whether the one or more receiving devices are coupled to the transmitter further includes if a minimum of the measured signal versus frequency is below a threshold value.

4. The method according to claim 1, wherein the second power level is higher than the first power level.

5. An apparatus comprising:
    a transmitter, including an antenna, wherein the transmitter is configured to transmit power at a multiplicity of frequencies between a first transmission frequency and a second transmission frequency at a first power level; and
    a controller configured to measure a signal at each transmission frequency at an antenna of the transmitter and determine whether one or more receiving devices are coupled to the transmitter based on the measured signal by determining if a number of local minima of the measured signal versus frequency is greater than or equal to 2, wherein
    the transmitter is further configured to transmit power at a second power level and at one or more frequencies between the first transmission frequency and the second transmission frequency if the one or more receiving devices are determined to be coupled to the transmitter.

6. The apparatus according to claim 5, wherein the measured signal is selected from the group consisting of: a reflected voltage wave amplitude, a ratio of the reflected voltage wave amplitude to a forward voltage wave amplitude, a reflected power, and a ratio of the reflected power to a forward power.

7. The apparatus according to claim 5, wherein, to determine whether the one or more receiving devices are coupled to the transmitter, the controller is further configured to determine if a minimum value of the measured signal versus frequency is below a threshold value.

8. The apparatus according to claim 5, wherein the second power level is higher than the first power level.

9. A method comprising:
    transmitting a superposition of a power signal at a first power level at a first frequency with a power signal at a second power level at a second frequency from an antenna of a transmitter, wherein the power signal at the second power level is incremented in transmission frequency from a first value to a second value;
    measuring a time signal indicative of a transmitter-to-receiver coupling criteria at each frequency point;
    separating the measured time signal into a first component and a second component including performing a frequency transform of the measured time signal and isolating a component of the measured time signal corresponding to a frequency band around the second frequency;
    determining whether the second component meets the transmitter-to-receiver coupling criteria; and
    transmitting, from the antenna of the transmitter to a receiver, at the first power level and at one or more frequencies between the first frequency and the second frequency if the receiver is determined to be coupled based on the transmitter-to-receiver coupling criteria.

10. The method according to claim 9, wherein the measured time signal is measured at the antenna of the transmitter or at an antenna of the receiver.

11. The method according to claim 9, wherein the measured time signal indicative of the transmitter-to-receiver coupling criteria is selected from the group consisting of: a reflected voltage wave amplitude, a ratio of the reflected voltage wave amplitude to a forward voltage wave amplitude, a reflected power, and a ratio of the reflected power to a forward power.

12. The method according to claim 9, wherein the transmitter-to-receiver coupling criteria measured at the transmitter is a minimum value of the ratio of the reflected voltage wave amplitude to the forward voltage wave amplitude, or a minimum value of the ratio of the reflected power to the forward power, or a minimum value of the reflected voltage wave amplitude, or a minimum value of the reflected voltage wave amplitude.

13. The method according to claim 9, wherein the transmitter-to-receiver coupling criteria is measured at the receiver and is a maximum value of received power, or a maximum value of received voltage.

14. A method comprising:
    transmitting a superposition of a power signal at a first power level at a first frequency with a power signal at a second power level at a second frequency from an antenna of a transmitter, wherein the power signal at the second power level is incremented in transmission frequency from a first value to a second value;
    measuring a time signal indicative of a transmitter-to-receiver coupling criteria at each frequency point;
    separating the measured time signal into a first component and a second component including using a demodulation circuit where the measured time signal is separately multiplied by an amplitude-scaled version of the power signal at the first power level at the first frequency and the power signal at the second power level at the second frequency and each resulting signal is subsequently low-pass filtered to result in the first component and the second component;

determining whether the second component meets the transmitter-to-receiver coupling criteria; and transmitting, from the antenna of the transmitter to a receiver, at the first power level and at one or more frequencies between the first frequency and the second frequency if the receiver is determined to be coupled based on the transmitter-to-receiver coupling criteria.

15. The method according to claim 14, wherein the measured time signal indicative of the transmitter-to-receiver coupling criteria is selected from the group consisting of: a reflected voltage wave amplitude, a ratio of the reflected voltage wave amplitude to a forward voltage wave amplitude, a reflected power, and a ratio of the reflected power to a forward power.

16. The method according to claim 14, wherein the transmitter-to-receiver coupling criteria measured at the transmitter is a minimum value of the ratio of the reflected voltage wave amplitude to the forward voltage wave amplitude, or a minimum value of the ratio of the reflected power to the forward power, or a minimum value of the reflected voltage wave amplitude, or a minimum value of the reflected voltage wave amplitude.

17. The method according to claim 14, wherein the transmitter-to-receiver coupling criteria is measured at the receiver and is a maximum value of received power, or a maximum value of received voltage.

18. An apparatus comprising:

a transmitter, including an antenna, wherein the transmitter is configured to transmit a superposition of a power signal at a first power level at a first frequency with a power signal at a second power level at a second frequency, wherein the power signal at the second power level is incremented in transmission frequency from a first value to a second value; and a controller configured to measure a time signal indicative of a transmitter-to-receiver coupling criteria at the antenna of the transmitter at each frequency point, separate the measured time signal into a first component and a second component by performing a frequency transform of the measured time signal and isolating a component of the measured time signal corresponding to a frequency band around the second frequency, and determine whether the second component meets the transmitter-to-receiver coupling criteria, wherein the transmitter is further configured to transmit, from the antenna of the transmitter, at the first power level and at one or more frequencies between the first frequency and the second frequency if the transmitter-to-receiver coupling criteria is met.

19. The apparatus according to claim 18, wherein the transmitter-to-receiver coupling criteria is measured at the receiver and is a maximum value of received power, or a maximum value of received voltage.

20. The apparatus according to claim 18, wherein the measured time signal indicative of the transmitter-to-receiver coupling criteria is selected from the group consisting of: a reflected voltage wave amplitude, a ratio of the reflected voltage wave amplitude to a forward voltage wave amplitude, a reflected power, and a ratio of the reflected power to a forward power.

21. An apparatus comprising:

a transmitter, including an antenna, wherein the transmitter is configured to transmit a superposition of a power signal at a first power level at a first frequency with a power signal at a second power level at a second frequency, wherein the power signal at the second power level is incremented in transmission frequency from a first value to a second value; and a controller configured to:

measure a time signal indicative of a transmitter-to-receiver coupling criteria at the antenna of the transmitter at each frequency point, separate the measured time signal into a first component and a second component by using a demodulation circuit where the measured time signal is separately multiplied by an amplitude-scaled version of the power signal at the first power level at the first frequency and the power signal at the second power level at the second frequency and each resulting signal is subsequently low-pass filtered to result in the first component and the second component, and determine whether the second component meets the transmitter-to-receiver coupling criteria, wherein the transmitter is further configured to transmit, from the antenna of the transmitter, at the first power level and at one or more frequencies between the first frequency and the second frequency if the transmitter-to-receiver coupling criteria is met.

22. The apparatus according to claim 21, wherein the measured time signal indicative of the transmitter-to-receiver coupling criteria is selected from the group consisting of: a reflected voltage wave amplitude, a ratio of the reflected voltage wave amplitude to a forward voltage wave amplitude, a reflected power, and a ratio of the reflected power to a forward power.

* * * * *